US012671731B2

(12) United States Patent
Korany et al.

(10) Patent No.: US 12,671,731 B2
(45) Date of Patent: Jun. 30, 2026

(54) VIDEO ENCODING TECHNIQUES FOR LOW LATENCY APPLICATIONS

(71) Applicant: QUALCOMM Incorporated, San Diego, CA (US)

(72) Inventors: Belal Salama Amin Korany, San Diego, CA (US); Thomas Stockhammer, Bergen (DE); Peerapol Tinnakornsrisuphap, San Diego, CA (US); Yong He, San Diego, CA (US); Prashanth Haridas Hande, San Diego, CA (US); Hyun Yong Lee, San Diego, CA (US); Saadallah Kassir, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 58 days.

(21) Appl. No.: 18/982,878

(22) Filed: Dec. 16, 2024

(65) Prior Publication Data

US 2026/0172463 A1     Jun. 18, 2026

(51) Int. Cl.
| | |
|---|---|
| *H04L 65/75* | (2022.01) |
| *H04L 65/80* | (2022.01) |
| *H04N 19/172* | (2014.01) |

(52) U.S. Cl.
CPC ............ *H04L 65/765* (2022.05); *H04L 65/80* (2013.01); *H04N 19/172* (2014.11)

(58) Field of Classification Search
None
See application file for complete search history.

(56) References Cited

U.S. PATENT DOCUMENTS

| | | | |
|---|---|---|---|
| 2017/0078676 A1* | 3/2017 | Coward ............... | H04N 19/164 |
| 2024/0381339 A1 | 11/2024 | Kassir et al. | |

FOREIGN PATENT DOCUMENTS

| | | | |
|---|---|---|---|
| WO | WO-2018075465 A1 | 4/2018 | |
| WO | WO-2020194092 A1 | 10/2020 | |
| WO | WO-2025202697 A1 * | 10/2025 | .......... H04W 72/543 |

OTHER PUBLICATIONS

Stockhammer T., "System and Cross-Layer Design for Mobile Video Transmission", Technische Universitat Munchen, Lehrstuhl fur Nachrichtentechnik, Sep. 24, 2008, 344 Pages, VideoDecoder Interface, Clause 8 and Figure 8.1, pp. 229-261.
International Search Report and Written Opinion—PCT/US2025/ 057714—ISA/EPO—Apr. 13, 2026.

* cited by examiner

*Primary Examiner* — Cai Y Chen
(74) *Attorney, Agent, or Firm* — Holland & Hart LLP

(57)     ABSTRACT

Methods, systems, and devices for wireless communications are described. A network entity may receive, from a first device, a first message comprising an indication of a first quality of experience (QoE)-bitrate (QB) curve associated with a first frame of a set of frames associated with a video stream. The first device may be an application server or a user equipment (UE). Based on the first QB curve, the network entity may transmit an operating point for encoding the first frame to the first device. The network entity may receive, from the first device, a second message comprising a first packet data unit (PDU) set associated with the encoded first frame, where the first frame is encoded based on the operating point. The network entity may transmit the first PDU set to one or more UEs.

30 Claims, 16 Drawing Sheets

130

105

115

Network
Entity

Transceiver

1010

Antenna

1015

Communications
Manager

1020

Memory

Code

1030

1025

1040

Processor

1035

1005

1000

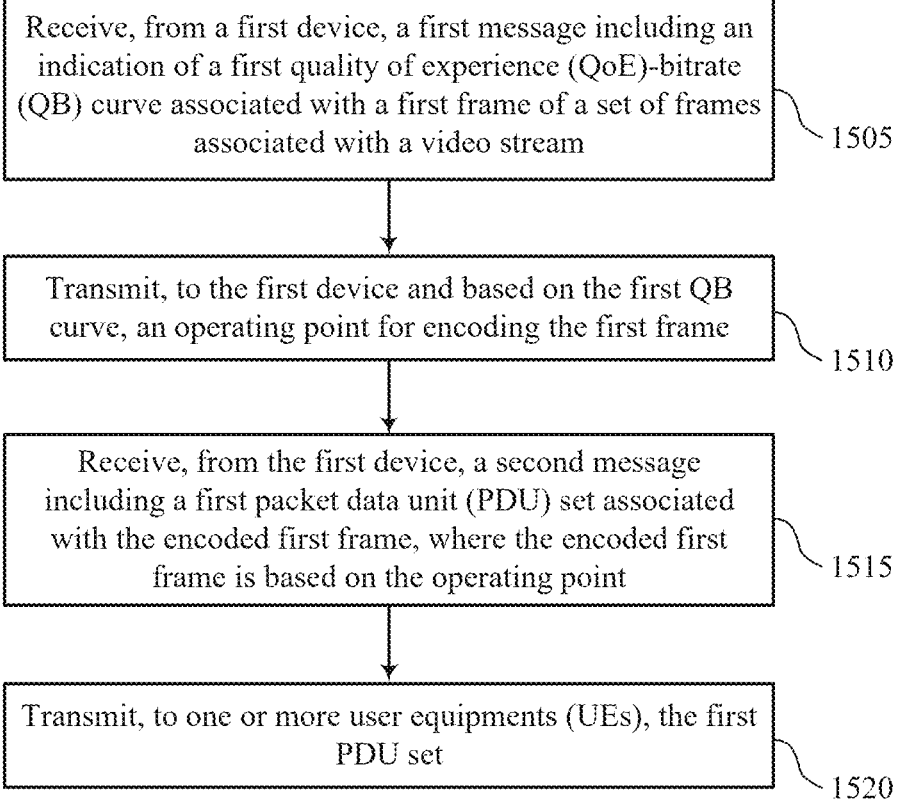

Receive, from a first device, a first message including an indication of a first quality of experience (QoE)-bitrate (QB) curve associated with a first frame of a set of frames associated with a video stream

1505

Transmit, to the first device and based on the first QB curve, an operating point for encoding the first frame

1510

Receive, from the first device, a second message including a first packet data unit (PDU) set associated with the encoded first frame, where the encoded first frame is based on the operating point

1515

Transmit, to one or more user equipments (UEs), the first PDU set

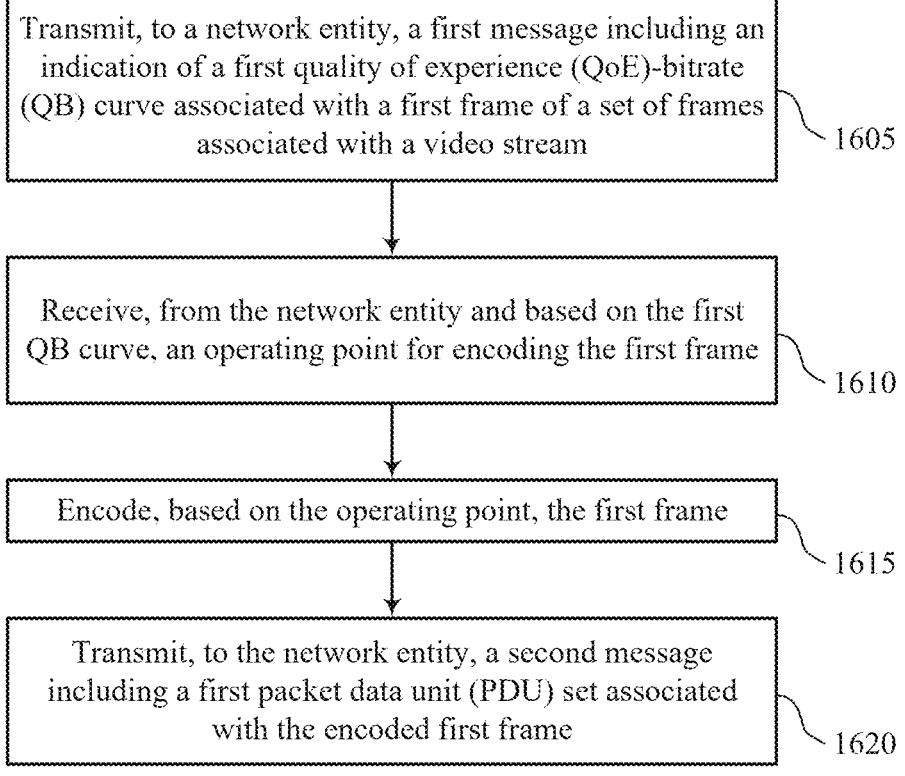

Transmit, to a network entity, a first message including an
indication of a first quality of experience (QoE)-bitrate
(QB) curve associated with a first frame of a set of frames
associated with a video stream
1605

Receive, from the network entity and based on the first
QB curve, an operating point for encoding the first frame
1610

Encode, based on the operating point, the first frame
1615

Transmit, to the network entity, a second message
including a first packet data unit (PDU) set associated
with the encoded first frame
1620

VIDEO ENCODING TECHNIQUES FOR LOW LATENCY APPLICATIONS

FIELD OF TECHNOLOGY

The following relates to wireless communications, including video encoding techniques for low latency applications.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The systems, methods, and devices of this disclosure each have several innovative aspects, no single one of which is solely responsible for the desirable attributes disclosed herein.

A method for wireless communications by a network entity is described. The method may include receiving, from a first device, a first message including an indication of a first quality of experience (QoE)-bitrate (QB) curve associated with a first frame of a set of frames associated with a video stream, transmitting, to the first device and based on the first QB curve, an operating point for encoding the first frame, receiving, from the first device, a second message including a first packet data unit (PDU) set associated with the encoded first frame, where the encoded first frame is based on the operating point, and transmitting, to one or more UEs, the first PDU set.

A network entity for wireless communications is described. The network entity may include one or more memories storing processor executable code, and one or more processors coupled with the one or more memories. The one or more processors may individually or collectively be operable to execute the code to cause the network entity to receive, from a first device, a first message including an indication of a first QB curve associated with a first frame of a set of frames associated with a video stream, transmit, to the first device and based on the first QB curve, an operating point for encoding the first frame, receive, from the first device, a second message including a first PDU set associated with the encoded first frame, where the encoded first frame is based on the operating point, and transmit, to one or more UEs, the first PDU set.

Another network entity for wireless communications is described. The network entity may include means for receiving, from a first device, a first message including an indication of a first QB curve associated with a first frame of a set of frames associated with a video stream, means for transmitting, to the first device and based on the first QB curve, an operating point for encoding the first frame, means for receiving, from the first device, a second message including a first PDU set associated with the encoded first frame, where the encoded first frame is based on the operating point, and means for transmitting, to one or more UEs, the first PDU set.

A non-transitory computer-readable medium storing code for wireless communications is described. The code may include instructions executable by one or more processors to receive, from a first device, a first message including an indication of a first QB curve associated with a first frame of a set of frames associated with a video stream, transmit, to the first device and based on the first QB curve, an operating point for encoding the first frame, receive, from the first device, a second message including a first PDU set associated with the encoded first frame, where the encoded first frame is based on the operating point, and transmit, to one or more UEs, the first PDU set.

In some examples of the method, network entities, and non-transitory computer-readable medium described herein, the first frame may be a current frame, the first QB curve may be associated with the current frame, and the first PDU set included in the second message may be associated with the current frame.

In some examples of the method, network entities, and non-transitory computer-readable medium described herein, the first frame may be a next frame after a current frame, the first QB curve may be associated with the next frame, the first message further includes a second PDU set associated with the current frame, the first PDU set included in the second message may be associated with the next frame, and the second message further includes an indication of a second QB curve associated with a subsequent frame after the next frame.

In some examples of the method, network entities, and non-transitory computer-readable medium described herein, first QB curve associated with the next frame may be estimated based on a last generated frame.

In some examples of the method, network entities, and non-transitory computer-readable medium described herein, the first frame may be associated with a first segment of the video stream and the first QB curve associated with the next frame may be estimated based on one or more most recent generated frames within the first segment.

In some examples of the method, network entities, and non-transitory computer-readable medium described herein, the first frame may be a progressively-encoded current frame, the first QB curve may be associated with the progressively-encoded current frame, the first message further includes a second PDU set associated with the progressively-encoded current frame, the first PDU set included in the second message may be associated with a progressively-encoded next frame, and the second message further includes an indication of a second QB curve associated with the progressively-encoded next frame.

In some examples of the method, network entities, and non-transitory computer-readable medium described herein, the progressively-encoded current frame includes a set of multiple PDU layers.

In some examples of the method, network entities, and non-transitory computer-readable medium described herein, the set of multiple PDU layers include a base PDU layer and one or more additional PDU layers and each of the one or more additional PDU layers may be associated with an increased level of quality relative to a previous PDU layer of the set of multiple PDU layers.

Some examples of the method, network entities, and non-transitory computer-readable medium described herein may further include operations, features, means, or instructions for truncating, based on the first QB curve, the progressively-encoded current frame to remove one or more of the set of multiple PDU layers. In some examples of the method, network entities, and non-transitory computer-readable medium described herein, transmitting the first PDU set associated with the encoded first frame includes transmitting, to at least one user equipment (UE) of the one or more UEs, the truncated progressively-encoded current frame.

In some examples of the method, network entities, and non-transitory computer-readable medium described herein, the progressively-encoded current frame may be truncated based on channel conditions associated with the network entity or a QoE target associated with the at least one UE.

Some examples of the method, network entities, and non-transitory computer-readable medium described herein may further include operations, features, means, or instructions for transmitting, to the first device, an indication of a quantity of PDU layers included in the truncated progressively-encoded current frame.

In some examples of the method, network entities, and non-transitory computer-readable medium described herein, the first QB curve may be based on complexity information associated with the first frame.

In some examples of the method, network entities, and non-transitory computer-readable medium described herein, the first QB curve may be based on one or more QoE metrics corresponding to a set of multiple encoding bitrates for encoding the first frame.

In some examples of the method, network entities, and non-transitory computer-readable medium described herein, the one or more QoE metrics include may be a peak signal-to-noise ratio (PSNR), a structural similarity index (SSIM), a video multi-method assessment fusion (VMAF), or a mean opinion score (MOS).

In some examples of the method, network entities, and non-transitory computer-readable medium described herein, a respective QB curve may be received for each frame of the set of frames, for each segment of the video stream, or based on a scene change in the video stream.

In some examples of the method, network entities, and non-transitory computer-readable medium described herein, the first device includes an application server or a UE.

A method for wireless communications by a first device is described. The method may include transmitting, to a network entity, a first message including an indication of a first quality of experience QB curve associated with a first frame of a set of frames associated with a video stream, receiving, from the network entity and based on the first QB curve, an operating point for encoding the first frame, encoding, based on the operating point, the first frame, and transmitting, to the network entity, a second message including a first PDU set associated with the encoded first frame.

A first device for wireless communications is described. The first device may include one or more memories storing processor executable code, and one or more processors coupled with the one or more memories. The one or more processors may individually or collectively be operable to execute the code to cause the first device to transmit, to a network entity, a first message including an indication of a first QB curve associated with a first frame of a set of frames associated with a video stream, receive, from the network entity and based on the first QB curve, an operating point for encoding the first frame, encode, based on the operating point, the first frame, and transmit, to the network entity, a second message including a first PDU set associated with the encoded first frame.

Another first device for wireless communications is described. The first device may include means for transmitting, to a network entity, a first message including an indication of a first QB curve associated with a first frame of a set of frames associated with a video stream, means for receiving, from the network entity and based on the first QB curve, an operating point for encoding the first frame, means for encoding, based on the operating point, the first frame, and means for transmitting, to the network entity, a second message including a first PDU set associated with the encoded first frame.

A non-transitory computer-readable medium storing code for wireless communications is described. The code may include instructions executable by one or more processors to transmit, to a network entity, a first message including an indication of a first QB curve associated with a first frame of a set of frames associated with a video stream, receive, from the network entity and based on the first QB curve, an operating point for encoding the first frame, encode, based on the operating point, the first frame, and transmit, to the network entity, a second message including a first PDU set associated with the encoded first frame.

In some examples of the method, first devices, and non-transitory computer-readable medium described herein, the first frame may be a current frame, the first QB curve may be associated with the current frame, and the first PDU set included in the second message may be associated with the current frame.

Some examples of the method, first devices, and non-transitory computer-readable medium described herein may further include operations, features, means, or instructions for encoding a current frame. In some examples of the method, first devices, and non-transitory computer-readable medium described herein, transmitting the first message includes transmitting the first message including: a second PDU set associated with the encoded current frame, and the indication of the first QB curve, where the first QB curve may be associated with a next frame after the current frame. In some examples of the method, first devices, and non-transitory computer-readable medium described herein, encoding the first frame includes encoding the next frame. In some examples of the method, first devices, and non-transitory computer-readable medium described herein, transmitting the second message includes transmitting the second message including: the first PDU set, where the first PDU set may be associated with the encoded next frame, and an indication of a second QB curve associated with a subsequent frame after the next frame.

In some examples of the method, first devices, and non-transitory computer-readable medium described herein, first QB curve associated with the next frame may be estimated based on a last generated frame.

In some examples of the method, first devices, and non-transitory computer-readable medium described herein, the first frame may be associated with a first segment of the video stream and the first QB curve associated with the next frame may be estimated based on one or more most recent generated frames within the first segment.

In some examples of the method, first devices, and non-transitory computer-readable medium described herein, encoding the first frame may include operations, features, means, or instructions for progressively encoding a current frame. In some examples of the method, first devices, and non-transitory computer-readable medium described herein, transmitting the first message includes transmitting the first message including: a second PDU set associated with the progressively-encoded current frame, and the indication of the first QB curve, where the first QB curve may be associated with the progressively-encoded current frame. In some examples of the method, first devices, and non-transitory computer-readable medium described herein, transmitting the second message includes transmitting the second message including: the first PDU set, where the first PDU set may be associated with a progressively-encoded next frame, and an indication of the second QB curve associated with the progressively-encoded next frame.

In some examples of the method, first devices, and non-transitory computer-readable medium described herein, the progressively-encoded current frame includes a set of multiple PDU layers.

In some examples of the method, first devices, and non-transitory computer-readable medium described herein, the set of multiple PDU layers includes a base PDU layer and one or more additional PDU layers. In some examples of the method, first devices, and non-transitory computer-readable medium described herein, progressively encoding the current frame may include operations, features, means, or instructions for encoding the base PDU layer with a minimum level of quality and encoding each of the one or more additional PDU layers with an increased level of quality relative to a previous PDU layer of the set of multiple PDU layers.

Some examples of the method, first devices, and non-transitory computer-readable medium described herein may further include operations, features, means, or instructions for receiving, from the network entity, an indication of a quantity of PDU layers included in the progressively-encoded current frame after one or more PDU layers may be truncated by the network entity.

In some examples of the method, first devices, and non-transitory computer-readable medium described herein, the first QB curve may be based on complexity information associated with the first frame.

Some examples of the method, first devices, and non-transitory computer-readable medium described herein may further include operations, features, means, or instructions for receiving, from an application, the first frame and estimating, based on one or more QoE metrics corresponding to a set of multiple encoding bitrates for encoding the first frame, the first QB curve.

In some examples of the method, first devices, and non-transitory computer-readable medium described herein, the one or more QoE metrics include may be a PSNR, a SSIM, a VMAF, or a MOS.

Some examples of the method, first devices, and non-transitory computer-readable medium described herein may further include operations, features, means, or instructions for estimating a QB curve for each frame of the set of frames, for each segment of the video stream, or based on a scene change in the video stream.

In some examples of the method, first devices, and non-transitory computer-readable medium described herein, the first device includes an application server or a UE.

Details of one or more implementations of the subject matter described in this disclosure are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

FIGS. 15 and 16 show flowcharts illustrating methods that support video encoding techniques for low latency applications in accordance with one or more aspects of the present disclosure.

DETAILED DESCRIPTION

Figure 1:
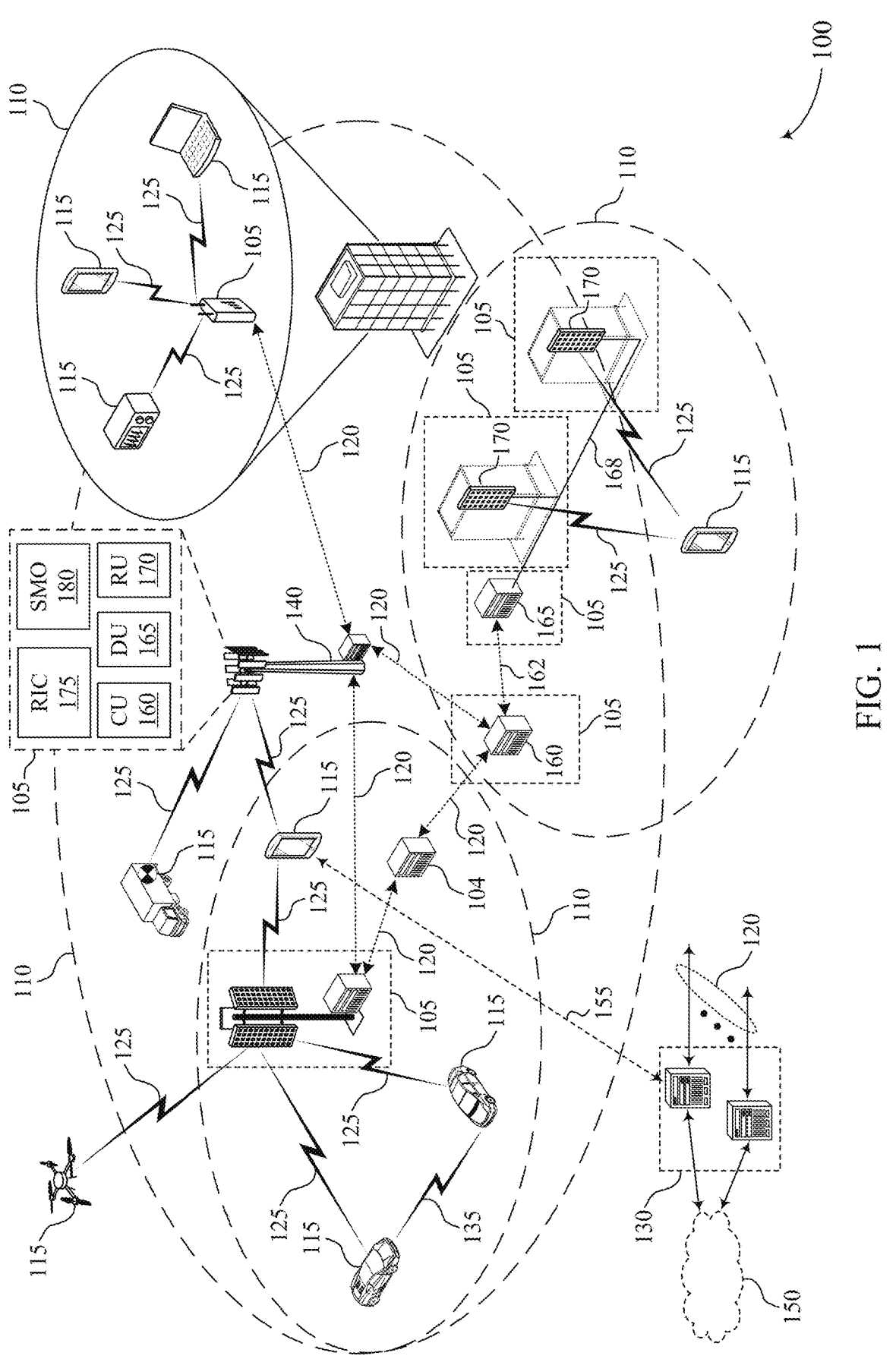
FIG. 1 shows an example of a wireless communications system that supports video encoding techniques for low latency applications in accordance with one or more aspects of the present disclosure.

Wireless communication systems may transmit and receive various types of data, such as voice, video, images, messaging, etc., over a wireless network. The various types of data may have varying system requirements for bandwidth, latency, packet loss, priority, or the like. As such, some wireless communication systems may utilize various quality of service (QoS) mechanisms to manage and ensure performance and reliability, and to prioritize different types of data traffic over the wireless network. In some wireless communications systems, some applications, such as XRrelated applications or other immersive applications, may require reliable, latency-bound (e.g., real-time with no buffering) video streaming that requires very high data rates and also very low latencies to maintain an acceptable level of quality for a user experience. In some cases, the QoS mechanisms used to handle traffic for these applications may rely on data rate and latency metrics for maintaining a specific data rate or latency for the application. However, such metrics might not be adequate for such low latency applications, because the metrics may not reflect the actual quality of experience (QoE) of the user. For instance, due to a slow response to rapid channel variations or network loading conditions, the QoS framework may not be suitable for maintaining a good QoE. Instead, maintaining a good QoE may require fast and granular coordination between the applications and the wireless communications system.

Some wireless communications systems may attempt to ensure coordination between the applications and the wireless communications system, such as by increasing application awareness at the network and increasing network awareness at the application. For instance, to increase application awareness at the network, an application may provide the network with information associated with traffic at the application or with the media or content being sent by the application. Such information may be provided through packet data unit (PDU) sets associated with data being sent by the application. That is, the application may bundle one or more PDUs associated with application data, such as a video data, into groups or sets for transmission efficiency. The one or more PDUs in a PDU set may carry a payload of a unit of information generated at approximately the same time at an application layer. For instance, the unit of information may be a unit of media information, such as frames or video slides. The PDU sets may further carry information related to characteristics of the PDU set, such as a size of the PDU set, an importance of the PDU set, etc. And to increase network awareness at the application, the network may provide the application with timing information that the application may use to shift its traffic to align with the timings of the network. However, the sharing of such information may not be sufficient for maintaining a good QoE, and it may be beneficial for the network to be aware of additional information associated with the application in order to further enhance the user experience.

In accordance with aspects described herein, an application server may send additional information about the application to the network (e.g., to a network entity). For example, the additional information may be related to a complexity of a video being streamed by the application and may be included in corresponding PDU sets sent to the network. The network, in turn, may use the information related to the complexity of the video to optimize its operation. In accordance with aspects described herein, the video complexity information may be provided in the form of an indication of a QoE-bitrate (QB) curve. The QB curve may represent different estimations of QoEs that may be experienced by a user if a video frame is encoded with corresponding different bitrates. The QB curve may be estimated by an enhanced video encoder implemented at the application server. The QB curve may be defined by a set of values corresponding to points on a curve, where each point corresponds to a QoE estimated to be experienced at a particular encoding bitrate. In this case, the estimated QoE may be a measure of one or more video quality metrics, such as a peak signal-to-noise ratio (PSNR), a structural similarity index (SSIM), a video multi-method assessment fusion (VMAF), a mean opinion score (MOS), or any other video quality metric. The network may receive an indication of the QB curve and may use the indication to determine an appropriate bitrate for encoding a video frame. In some cases, the network may signal the determined bitrate to the application for encoding of the video frame. The application may encode the video frame based on the determined bitrate and send the encoded video frame to the network for transmission to an application client, such as at a UE. In other cases, such as when the video frame has been progressively encoded by the application server, the network may receive the progressively encoded video frame from the application server together with an indication of an associated QB curve. The network may utilize the QB curve to determine an appropriate bitrate for the progressively encoded video frame and may then adjust a quality of the progressively encoded video frame to correspond to the determined bitrate. The network may, thereafter, transmit the adjusted encoded video frame to the application client.

In some cases, the network may additionally use the indication of the QB curve to optimize its own operation. For example, the network may use the indication of the QB curve to maintain subscription policies associated with UEs served by the network (e.g., where the UEs may subscribe for a certain minimum or maximum QoE); to balance loads for network energy savings (e.g., awareness of the video frame may enable the network to lower the bitrate for some video frames and, thus, achieve an energy savings); to assist in distributing resources across multiple UEs based on the QoE needs at particular UEs (e.g., to enhance network capacity, particularly in asymmetric UE channel conditions); or the like. Further, use of QB curve information of multiple UEs by the network may increase QoE capacity at the network (e.g., the quantity of UEs capable of simultaneously maintaining QoE requirements in the network).

Aspects of the disclosure are initially described in the context of wireless communications systems. Aspects of the disclosure are further illustrated by and described with reference to apparatus diagrams, system diagrams, and flowcharts that relate to video encoding techniques for low latency applications.

FIG. 1 shows an example of a wireless communications system 100 that supports video encoding techniques for low latency applications in accordance with one or more aspects of the present disclosure. The wireless communications system 100 may include one or more devices, such as one or more network devices (e.g., network entities 105), one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via communication link(s) 125 (e.g., a radio frequency (RF) access link). For example, a network entity 105 may support a coverage area 110 (e.g., a geographic coverage area) over which the UEs 115 and the network entity 105 may establish the communication link(s) 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices in the wireless communications system 100 (e.g., other wireless communication devices, including UEs 115 or network entities 105), as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with a core network 130, or with one another, or both. For example, network entities 105 may communicate with the core network 130 via backhaul communication link(s) 120 (e.g., in accordance with an S1, N2, N3, or other interface protocol). In some examples, network entities 105 may communicate with one another via backhaul communication link(s) 120 (e.g., in accordance with an X2, Xn, or other interface protocol) either directly (e.g., directly between network entities 105) or indirectly (e.g., via the core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication link(s) 120, midhaul communication links 162, or fronthaul communication links 168 may be or include one or more wired links (e.g., an electrical link, an optical fiber link) or one or more wireless links (e.g., a radio link, a wireless optical link), among other examples or various combinations thereof. A UE 115 may communicate with the core network 130 via a communication link 155.

One or more of the network entities 105 or network equipment described herein may include or may be referred to as a base station 140 (e.g., a base transceiver station, a radio base station, an NR base station, an access point, a radio transceiver, a NodeB, an eNodeB (eNB), a next-generation NodeB or giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within one network entity (e.g., a network entity 105 or a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among multiple network entities (e.g., network entities 105), such as an integrated access and backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU), such as a CU 160, a distributed unit (DU), such as a DU 165, a radio unit (RU), such as an RU 170, a RAN Intelligent Controller (RIC), such as an RIC 175 (e.g., a Near-Real Time RIC (Near-RT RIC), a Non-Real Time RIC (Non-RT RIC)), a Service Management and Orchestration (SMO) system, such as an SMO system 180, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more of the network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, or any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaptation protocol (SDAP), Packet Data Convergence Protocol (PDCP)). The CU 160 (e.g., one or more CUs) may be connected to a DU 165 (e.g., one or more DUs) or an RU 170 (e.g., one or more RUs), or some combination thereof, and the DUs 165, RUs 170, or both may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or multiple different RUs, such as an RU 170). In some cases, a functional split between a CU 160 and a DU 165 or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to a DU 165 via a midhaul communication link 162 (e.g., F1, F1-c, F1-u), and a DU 165 may be connected to an RU 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities (e.g., one or more of the network entities 105) that are in communication via such communication links.

In some wireless communications systems (e.g., the wireless communications system 100), infrastructure and spectral resources for radio access may support wireless backhaul link capabilities to supplement wired backhaul connections, providing an IAB network architecture (e.g., to a core network 130). In some cases, in an IAB network, one or more of the network entities 105 (e.g., network entities 105 or IAB node(s) 104) may be partially controlled by each other. The IAB node(s) 104 may be referred to as a donor entity or an IAB donor. A DU 165 or an RU 170 may be partially controlled by a CU 160 associated with a network entity 105 or base station 140 (such as a donor network entity or a donor base station). The one or more donor entities (e.g., IAB donors) may be in communication with one or more additional devices (e.g., IAB node(s) 104) via supported access and backhaul links (e.g., backhaul communication link(s) 120). IAB node(s) 104 may include an IAB mobile termination (IAB-MT) controlled (e.g., scheduled) by one or more DUs (e.g., DUs 165) of a coupled IAB donor. An IAB-MT may be equipped with an independent set of antennas for relay of communications with UEs 115 or may share the same antennas (e.g., of an RU 170) of IAB node(s) 104 used for access via the DU 165 of the IAB node(s) 104 (e.g., referred to as virtual IAB-MT (vIAB-MT)). In some examples, the IAB node(s) 104 may include one or more DUs (e.g., DUs 165) that support communication links with additional entities (e.g., IAB node(s) 104, UEs 115) within the relay chain or configuration of the access network (e.g., downstream). In such cases, one or more components of the disaggregated RAN architecture (e.g., the IAB node(s) 104 or components of the IAB node(s) 104) may be configured to operate according to the techniques described herein.

In the case of the techniques described herein applied in the context of a disaggregated RAN architecture, one or more components of the disaggregated RAN architecture may be configured to support video encoding techniques for low latency applications as described herein. For example, some operations described as being performed by a UE 115 or a network entity 105 (e.g., a base station 140) may additionally, or alternatively, be performed by one or more components of the disaggregated RAN architecture (e.g., components such as an IAB node, a DU 165, a CU 160, an RU 170, an RIC 175, an SMO system 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, vehicles, or meters, among other examples.

The UEs 115 described herein may be able to communicate with various types of devices, such as UEs 115 that may sometimes operate as relays, as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via the communication link(s) 125 (e.g., one or more access links) using resources associated with one or more carriers. The term "carrier" may refer to a set of RF spectrum resources having a defined PHY layer structure for supporting the communication link(s) 125. For example, a carrier used for the communication link(s) 125 may include a portion of an RF spectrum band (e.g., a bandwidth part (BWP)) that is operated according to one or more PHY layer channels for a given RAT (e.g., LTE, LTE-A, LTE-A Pro, NR). Each PHY layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities, such as one or more of the network entities 105).

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems, such as the wireless communications system 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (STTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to UEs 115 (e.g., one or more UEs) or may include UE-specific search space sets for sending control information to a UE 115 (e.g., a specific UE).

In some examples, a network entity 105 (e.g., a base station 140, an RU 170) may be movable and therefore provide communication coverage for a moving coverage area, such as the coverage area 110. In some examples, coverage areas 110 (e.g., different coverage areas) associated with different technologies may overlap, but the coverage areas 110 (e.g., different coverage areas) may be supported by the same network entity (e.g., a network entity 105). In some other examples, overlapping coverage areas, such as a coverage area 110, associated with different technologies may be supported by different network entities (e.g., the network entities 105). The wireless communications system 100 may include, for example, a heterogeneous network in which different types of the network entities 105 support communications for coverage areas 110 (e.g., different coverage areas) using the same or different RATs.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs (e.g., one or more of the UEs 115) via a device-to-device (D2D) communication link, such as a D2D communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1: M) system in which each UE 115 transmits to one or more of the UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than one hundred kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) RAT, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In some implementations, a core network 130 may implement (or be connected to) an application server that serves as a source of content to be communicated to one or more UEs 115 via one or more network entities 105. For instance, the application server may maintain multi-media content, e.g., video content, that is streamed to one or more UEs 115 via one or more network entities 105 that serve the one or more UEs 115. In some cases, to reduce latency associated with transmission of the video content and, thus, to improve a quality of a user experience at the UE 115 receiving the video content, it may be beneficial for a serving network entity 105 to be aware of (e.g., receive information associated with) characteristics of the video content. For instance, it may be beneficial for the network entity 105 to have knowledge of characteristics, such as a video complexity, of individual portions (e.g., video frames, slices, segments, etc.) of the video content. In this way, the network entity 105 may be able to adapt a bit rate of the individual portions of the video content to a bitrate that is appropriate for encoding that particular portion of the video content. In some cases, the network entity 105 may use such knowledge to improve its own operations, such as to balance network loads, to assist in distributing resources across multiple UEs, to increase overall QoE capacity at the network, etc.

Accordingly, in some implementations, a network entity 105 may receive from the application server an indication of a QB curve associated with a frame of video content being streamed to a UE 115. The QB curve may be defined by a set of values corresponding to points on a curve, where each point corresponds to a QoE estimated to be experienced when the video frame is encoded at a particular bitrate. The estimated QoE may be a measure of one or more video quality metrics, such as a PSNR, a SSIM, a VMAF, a MOS, or any other video quality metric. The network entity 105 may use the QB curve associated with the video frame to identify an operating point for encoding the video frame. For instance, the operating point may define one or more parameters, including a bitrate, for encoding the video frame. The network entity 105 may transmit the operating point to the application server for encoding the video frame. The application server may receive the operating point and may use the operating point to encode the video frame. The application server may then transmit the encoded frame to the network entity 105, which may then transmit the encoded frame to one or more UEs 115 for decoding.

In some implementations, rather than encoding the video frame after receiving an operating point from the network entity 105, the application server may progressively encode the video frame (e.g., encode the video frame in multiple layers, each layer corresponding to encoding of the video frame at a different bitrate) and may send the multi-layered encoded video frame to the network entity 105 together with an associated the QB curve. In such cases, the network entity 105 may utilize the QB curve to identify an operating point for the video frame and, in some cases, may truncate the multi-layered video frame by removing one or more layers based on the identified operating point, such that the resulting truncated encoded video frame may have a minimum quantity of layers sufficient to correspond to a bitrate associated with the identified operating point. The network entity 105 may then transmit the encoded frame to one or more UEs 115 for decoding.

Figure 2:
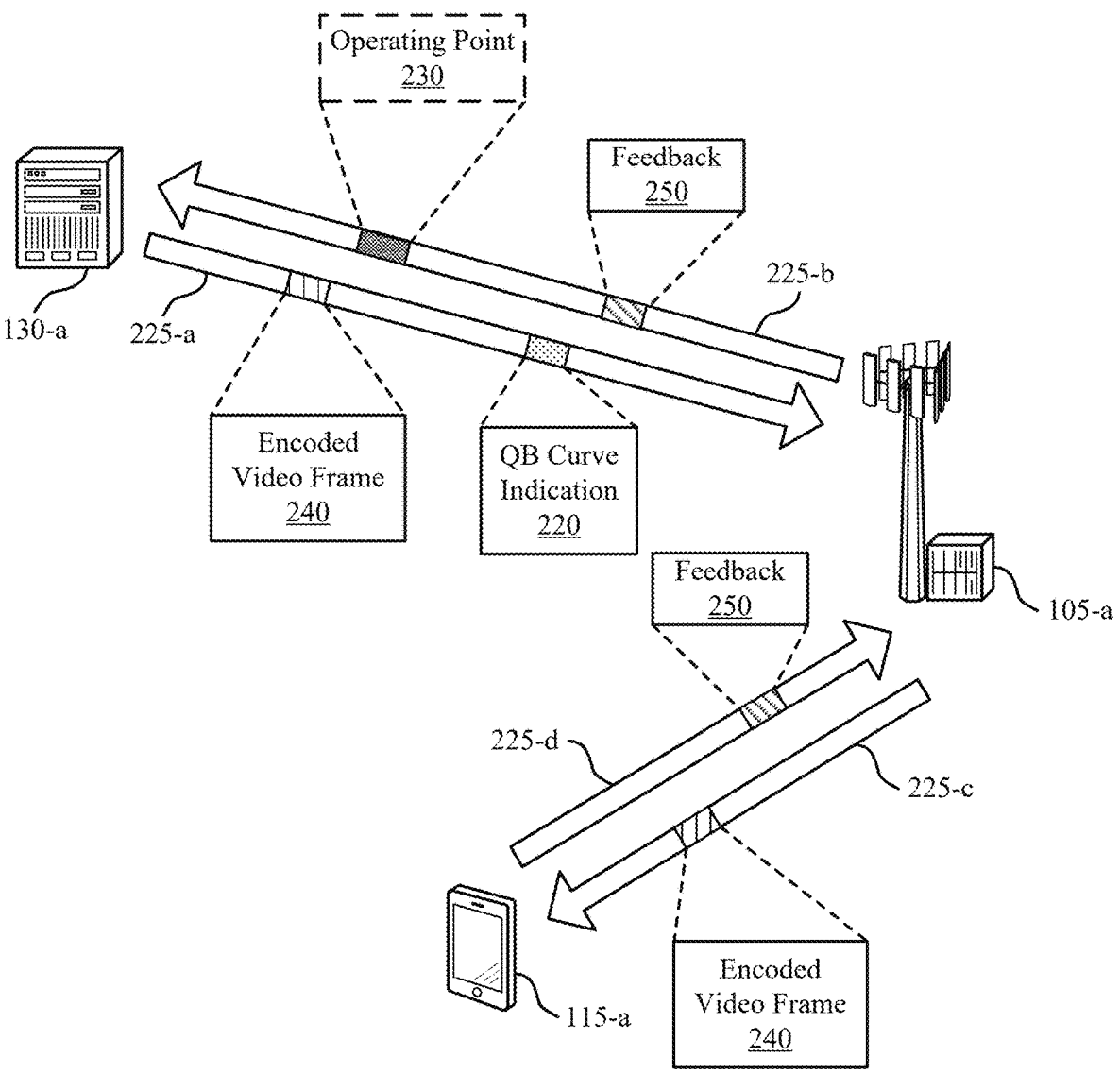
FIG. 2 shows an example of a portion of a wireless communication system that supports video encoding techniques for low latency applications in accordance with one or more aspects of the present disclosure.

FIG. 2 shows an example of a portion of a wireless communications system 200 that supports video encoding techniques for low latency applications in accordance with one or more aspects of the present disclosure. The wireless communications system 200 may implement or may be implemented by aspects of the wireless communications system 100 described with reference to FIG. 1. For instance, the wireless communications system 200 may include a core network 130-a, a network entity 105-a, and a UE 115-a, which may be examples of core network 130, network entities 105, and UEs 115, respectively, described with reference to FIG. 1. The core network 130-a, the network entity 105-a, and the UE 115-a may communicate using communications links 225-a, 225-b, 225-c, and 225-d, which may be examples of the communications links 125 described with reference to FIG. 1.

For instance, the core network 130-a may transmit, and the network entity 105-a may receive, communications via communications link 225-a. In accordance with aspects described herein, in some cases, the core network 130-a may implement (or be connected to) an application server, and the application server may generate a video bitstream to be transmitted to the UE 115-a via the network entity 105-a. In this case, the application server may send (e.g., via the core network 130-a), to the network entity 105-a and via the communications link 225-a, a message including a QB curve indication 220 associated with a video frame (e.g., a current or a next video frame) of the video bitstream. In some cases, the application server may additionally send, to the network entity 105-a and via the communications link 225-a, a message including an encoded video frame 240 (e.g., an encoded current or next video frame) of the video frame. In some cases, the application server may send the QB curve indication 220 and the encoded video frame 240 (e.g., a progressively encoded multi-layered video frame) in a single message.

In some cases, the network entity 105-a may receive the QB curve indication 220, and may utilize the QB curve indication 220 to identify an operating point 230 for encoding the video frame. In some cases, the network entity 105-a may send the operating point 230 to the application server. For instance, the network entity 105-a may transmit, and the core network 130-a (e.g., the application server) may receive, communications via a communications link 225-b. In accordance with aspects described herein, in some cases, the network entity 105-a may transmit, to the application server via the communications link 225-b, a message including the identified operating point 230. In such cases, the application server may receive the uplink message and may utilize the operating point 230 to encode the video frame, and then transmit the encoded video frame 240 to the network entity 105-a. In other cases, the network entity 105-a might not transmit the operating point 230 to the application server, and may itself use the operating point 230 to adjust (e.g., to remove one or more layers from) an encoded video frame 240 (e.g., a progressively encoded multi-layered video frame) received from the application server.

Thereafter, the network entity 105-a may send the encoded video frame 240 to the UE 115-a for decoding and consumption. For instance, the network entity 105-a may transmit, and the UE 115-a may receive, downlink communications via a downlink communications link 225-c. In accordance with aspects described herein, the network entity 105-a may transmit, to the UE 115-a via the downlink communications link 225-c, a downlink message including the encoded video frame 240. The UE 115-a may receive the downlink message and may decode the encoded video frame 240 and consume the decoded video frame, such as at an application client implemented at the UE 115-a.

In some cases, the UE 115-a may send feedback 250 associated with the received video frame. For instance, the UE 115-a may transmit, and the network entity 105-a may receive, uplink communications via an uplink communications link 225-d. In accordance with aspects described herein, the UE 115-a may transmit, to the network entity 105-a via the uplink communications link 225-d, an uplink message including the feedback 250. In some cases, the feedback 250 may include an indication of successful or unsuccessful delivery of the encoded video frame 240, one or more end-to-end (E2E) measurements, such as round trip time (RTT), error concealment, etc. The network entity 105-a may receive the feedback 250 and may further send the feedback 250 to the application server. For instance, the network entity 105-a may transmit, to the application server via the communications link 225-b, an uplink message including the feedback 250. The application server may utilize the feedback 250 for future encoding decisions.

Figure 3:
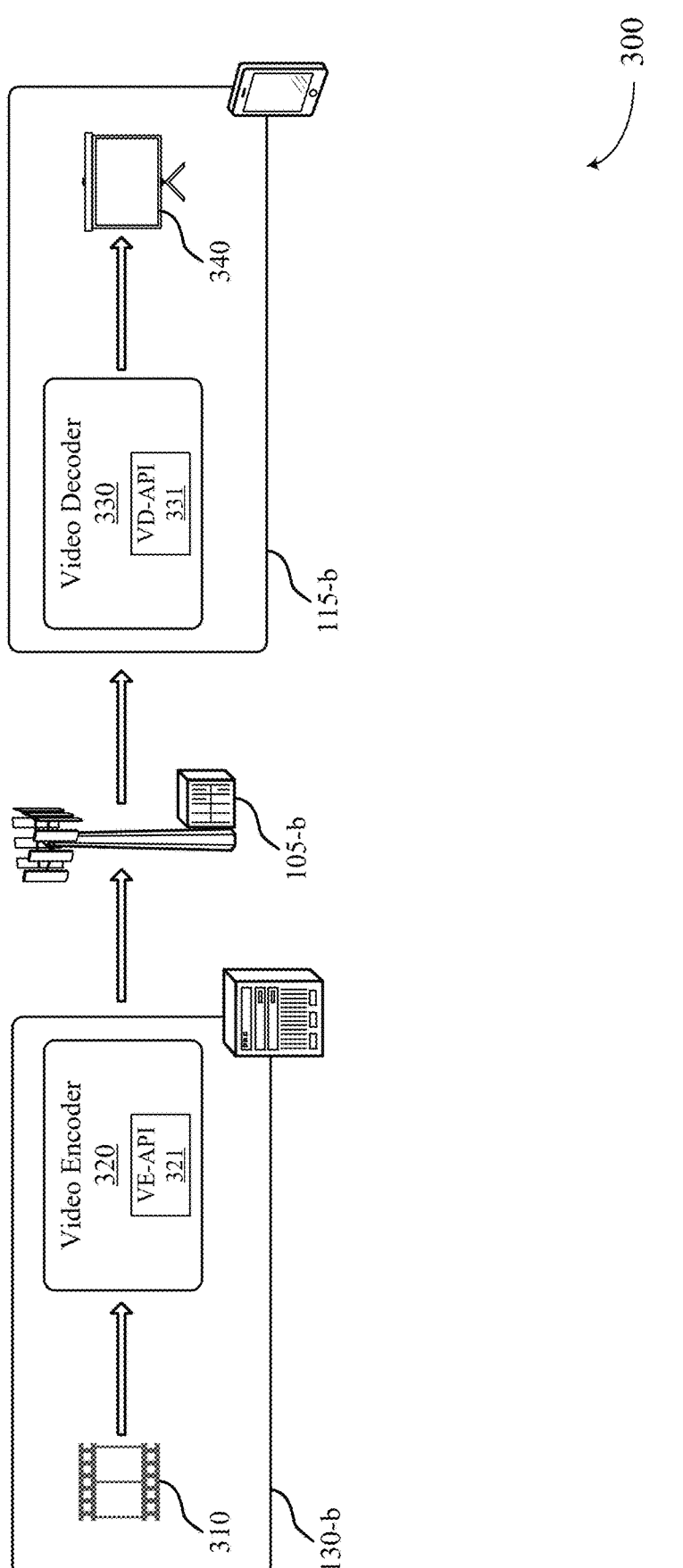
FIG. 3 shows an example of a system architecture that supports video encoding techniques for low latency applications in accordance with one or more aspects of the present disclosure.

FIG. 3 shows an example of a system architecture 300 that supports video encoding techniques for low latency applications in accordance with one or more aspects of the present disclosure. The system architecture 300 may support or be supported by aspects of the wireless communications systems 100 and 200 described with reference to FIGS. 1 and 2. For instance, the system architecture 300 may include an application server 130-b (e.g., implemented at or connected to a core network), a network entity 105-b, and a UE 115-b, which may be examples of core network 130, network entities 105, and UEs 115 described with reference to FIG. 1, and core network 130-a, network entity 105-a, and UE 115-a described with reference to FIG. 2.

In some implementations, the application server 130-b may serve as the source of a video bitstream that is consumed by an application client implemented at one or more UEs, such as application client 340 implemented at UE 115-b. For instance, the application server 130-b may be an edge server that serves one or more UEs in a geographic proximity of the application server 130-b. The application server 130-b may implement a video encoder 320 that receives and encodes a video frame 310 (or other portion such as a slice, segment, etc.) of the video bitstream (e.g., a real-time video). In accordance with aspects described herein, the video encoder 320 may be an enhanced encoder that additionally supports real-time QB curve estimation of the received video frame 310 (e.g., a current or one or more future frames). The video encoder 320 may further implement a video encoder-application programming interface (VE-API) 321 for accessing the video encoder 320. For instance, the VE-API 321 may be used by the network entity 105-b or one or more other entities, such as a cloud or edge application to access the video encoder 320.

The video encoder 320 may be statically configured with a video signal, a video codec profile or level, error concealment techniques (e.g., for reference frames), or the like. The video encoder 320 may be configured to receive, as input, real-time video (e.g., a video bitstream) at a constant frame rate (e.g., the video frame 310). In some cases, the video encoder may additionally be configured to receive as input an operating point or a bitrate that may be used to encode the video frame 310.

For instance, for each received video frame 310, the video encoder 320 may estimate a QB curve associated with the received video frame 310. In some cases, the QB curve may be estimated prior to encoding of the received video frame 310 and then may be used to more optimally encode the received video frame 310. For instance, the estimated QB curve may be defined by a set of values corresponding to QoEs estimated or expected to be experienced if the video frame 310 were to be encoded at a particular encoding bitrate. The estimated QoE may be a measure of one or more video quality metrics, such as a PSNR, a SSIM, a VMAF, a MOS, or any other video quality metric. In some cases, the QB curve may further be estimated based on additional information related to video frame sequence, such as an importance of a particular video frame, a scene change associated with the video frame, etc. The QB curve may provide an indication of a complexity of the video frame 310. In some cases, the video encoder 320 may take into account an impact of the estimated QB curve determination for future encoding. In some cases, the video encoder 320 may additionally determine a QoE associated with the video frame 310 after the frame is encoded.

The video encoder 320 may be configured to perform the QB curve estimation on a per frame basis, a per slice basis, a per segment basis, or based on detection of a scene change, such as where the change satisfies a threshold level of change. In some implementations, the video encoder 320 may perform QB curve estimation at a different frequency or based on different triggering events. In some cases, such as for non-real-time videos, the video encoder 320 may perform QB curve estimation offline and may store the results for later use, such as when the non-real-time video is being consumed by one or more UEs.

The indication of the QB curve for the video frame 310 may be provided to the network entity 105-b, via the VE-API 321, and may be utilized by the network entity 105-b to determine, based on conditions at the network entity 105-b, an appropriate bitrate for encoding the video frame 310. In some cases, the network entity 105-b may provide the video encoder 320 with the determined bitrate (e.g., via the VE-API 321), and the video encoder 320 may encode the video frame 310 with the determined bitrate. The video encoder 320 may be configured to output the encoded video frame 310 as a PDU set. The PDU set may include a payload that carries the encoded video frame and additional information related to characteristics of the PDU set, such as a size of the PDU set, an importance of the PDU set, etc. For instance, the network entity 105-b may receive or retrieve (e.g., via the VE-API 321) the PDU set corresponding to the encoded video frame 310.

In other cases, the video encoder 320 may progressively encode the video frame 310 in multiple layers, each layer corresponding to the video frame 310 being encoded a different bitrate, and may output the multi-layered encoded video frame 310 as a PDU set together with the indication of the QB curve (e.g., via the VE-API 321). The network entity 105-b may receive or retrieve (e.g., via the VE-API 321) the PDU set corresponding to the multi-layered encoded video frame 310, and the network entity 105-b may on its own adjust a quality of the encoded video frame 310 by removing one or more of the layers from the multi-layered encoded video frame 310, as needed, to ensure that the encoded video frame 310 corresponds to the determined bitrate.

The network entity 105-b may provide the encoded video frame 310 (either encoded by the video encoder 320 based on the determined bitrate or adjusted by the network entity 105-b based on the determined bitrate) to the UE 115-b (or in some cases, to one or more additional UEs). For instance, the UE 115-b may implement a video decoder 330 for decoding an encoded video frame, and the video decoder 330 may implement a video decoder-API (VD-API) 331 used to exchange information (e.g., a decoded video frame 310) between the video decoder 330 and one or more other entities, such as a client application. Accordingly, the video decoder 330 may receive from the network entity 105-b, via the VD-API 331, the encoded video frame 310. The video decoder 330 may decode the received encoded video frame 310 and provide the decoded video frame 310 to the application client 340 (e.g., via the VD-API 331) for consumption.

In some implementations, a method for testing the video encoder 320 may be provided. For instance, well-defined test cases, comprising test signals may be provided as input to the video encoder 320 and the correct output may be known, such as bitrates, margins, etc. A test application may be defined, which may retrieve test output from the video encoder 320, decode the test output using the video decoder 330, and compare the test output to the test signals. The test application may include functional, performance, and real-time tests. The tests may be utilized to determine whether timeline requirements, overall quality, or research and development expectations are satisfied.

Figure 4:
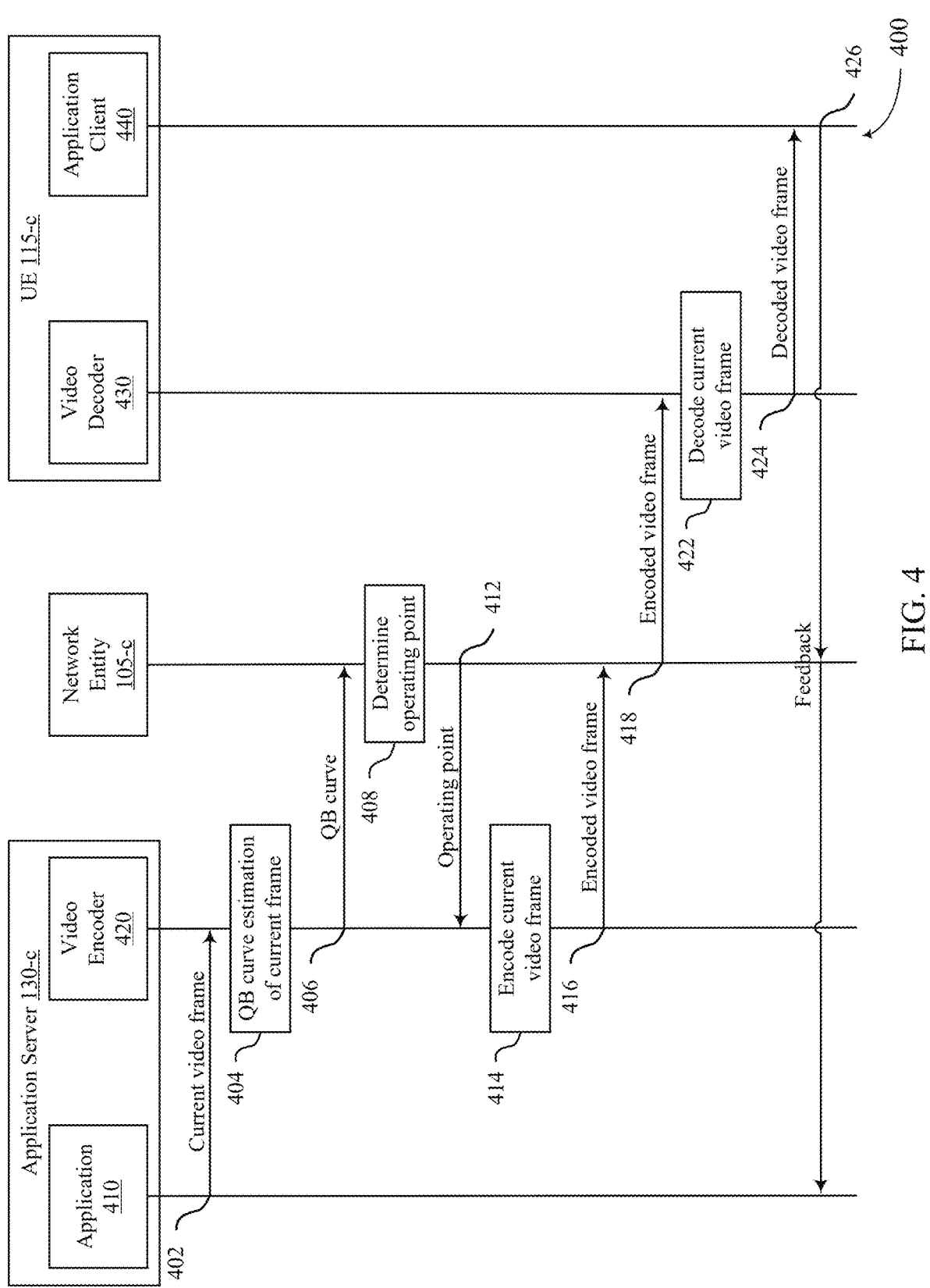
FIG. 4 shows an example of a signal flow that supports video encoding techniques for low latency applications in accordance with one or more aspects of the present disclosure.

FIG. 4 shows an example of a signal flow 400 that supports video encoding techniques for low latency applications in accordance with one or more aspects of the present disclosure. In some examples, signal flow 400 may implement aspects of or may be implemented by aspects of wireless communications systems 100 and 200 and the system architecture 300, described with reference to FIGS. 1 to 3. Signal flow 400 may be implemented by an application server 130-c, a network entity 105-c, and a UE 115-c, which may be examples of similar entities described with reference to FIGS. 1 to 3. The application server 130-c may include an application 410 and a video encoder 420. The application 410 may be an example of a video source that provides the video frame 310 described with reference to FIG. 3, and the video encoder 420 may be an example of the video encoder 320 described with reference to FIG. 3. The UE 115-c may include a video decoder 430 and an application client 440, which may be examples of the video decoder 330 and application client 340 described with reference to FIG. 3.

In the following description of the signal flow 400, the communications between the various entities may be performed in different orders or at different times. Some operations may also be omitted from the signal flow 400, and other operations may be added to the signal flow 400. In some examples, the operations illustrated in signal flow 400 may be performed by hardware (e.g., including circuitry, processing blocks, logic components, and other components), code (e.g., software or firmware) executed by a processor, or any combination thereof. Alternative examples of the following may be implemented, where some steps are performed in a different order than described or are not performed at all. In some cases, steps may include additional features not mentioned below, or further steps may be added.

At step 402, the application 410 may provide (e.g., send, transmit, etc.), and the video encoder 420 may receive, a video frame (e.g., the video frame 310 of FIG. 3) of a set of video frames (e.g., one or more video frames) associated with a video bitstream to be consumed by the UE 115-*c* (or one or more additional UEs). The video frame may be a current frame (e.g., an upcoming frame to be consumed by the UE 115-*c*). In some cases, the application 410 may, instead, provide some other portion of the video bitstream, such as a video slice, a video segment, or other portion.

At step 404, the video encoder 420 may receive the current video frame (or other portion of the video bitstream) and may estimate a QB curve for the current video frame. For instance, the video encoder 420 may begin an encoding process of the current video frame, such as by starting a motion compensation process. The video encoder 420, however, may halt the encoding process after completion of the motion compensation process, which may output information indicating a complexity of the current video frame. The frame complexity may be utilized by the video encoder 420 to estimate the QB curve for the current video frame. For instance, based on the frame complexity, the video encoder 420 may estimate a set of QoE values, where each value may correspond to a QoE estimated to be experienced at a UE based on the current video frame being encoded at a particular bitrate.

At step 406, while the encoding process remains halted, the video encoder 420 may transmit, and the network entity 105-*c* may receive, an indication of the QB curve. In some examples, the indication may be a set of values corresponding to the points of the QB curve or may be an index to a lookup table that includes the set of values corresponding to the points of the QB curve.

At step 408, the network entity 105-*c* may utilize the indication of the QB curve associated with the current video frame to determine an operating point for encoding the current video frame. For instance, the operating point may define one or more parameters, including an appropriate bitrate for encoding the current video frame. The network entity 105-*c* may further determine the appropriate bitrate based on conditions at the network entity 105-*c* (e.g., based on server or channel measurements at the network entity 105-*c*). In some cases, the network entity 105-*c* may further determine the appropriate bitrate for encoding the current video frame based on QB curves associated with one or more other UEs.

At step 412, the network entity 105-*c* may transmit, and the video encoder 420 may receive, the determined operating point for encoding the current video frame.

At step 414, the video encoder 420 may resume the encoding process of the current video frame and may utilize the received operating point for encoding the current video frame. The video encoder 420 may output the encoded current video frame as a PDU set.

At step 416, the video encoder 420 may transmit, and the network entity 105-*c* may receive, the PDU set corresponding to the encoded current video frame.

At step 418, the network entity 105-*c* may send the PDU set corresponding to the encoded current video frame to one or more UEs. For instance, the network entity 105-*c* may transmit, and the video decoder 430 implemented at the UE 115-*c* may receive, the PDU set corresponding to encoded current video frame.

At step 422, the video decoder 430 may decode the encoded current video frame.

At step 424, the video decoder 430 may provide (e.g., send, transmit, etc.), and the application client may receive, the decoded current video frame.

At step 426, the application client 440 may provide feedback related to the current video frame to the network entity 105-*c*, the application server 130-*c*, or both. For instance, the application client 440 may transmit feedback, via the network entity 105-*c*, to the application 410 at the application server 130-*c*. The feedback may include an indication of successful or unsuccessful delivery of the current video frame, one or more E2E measurements, such as RTT, error concealment, etc.

Figure 5:
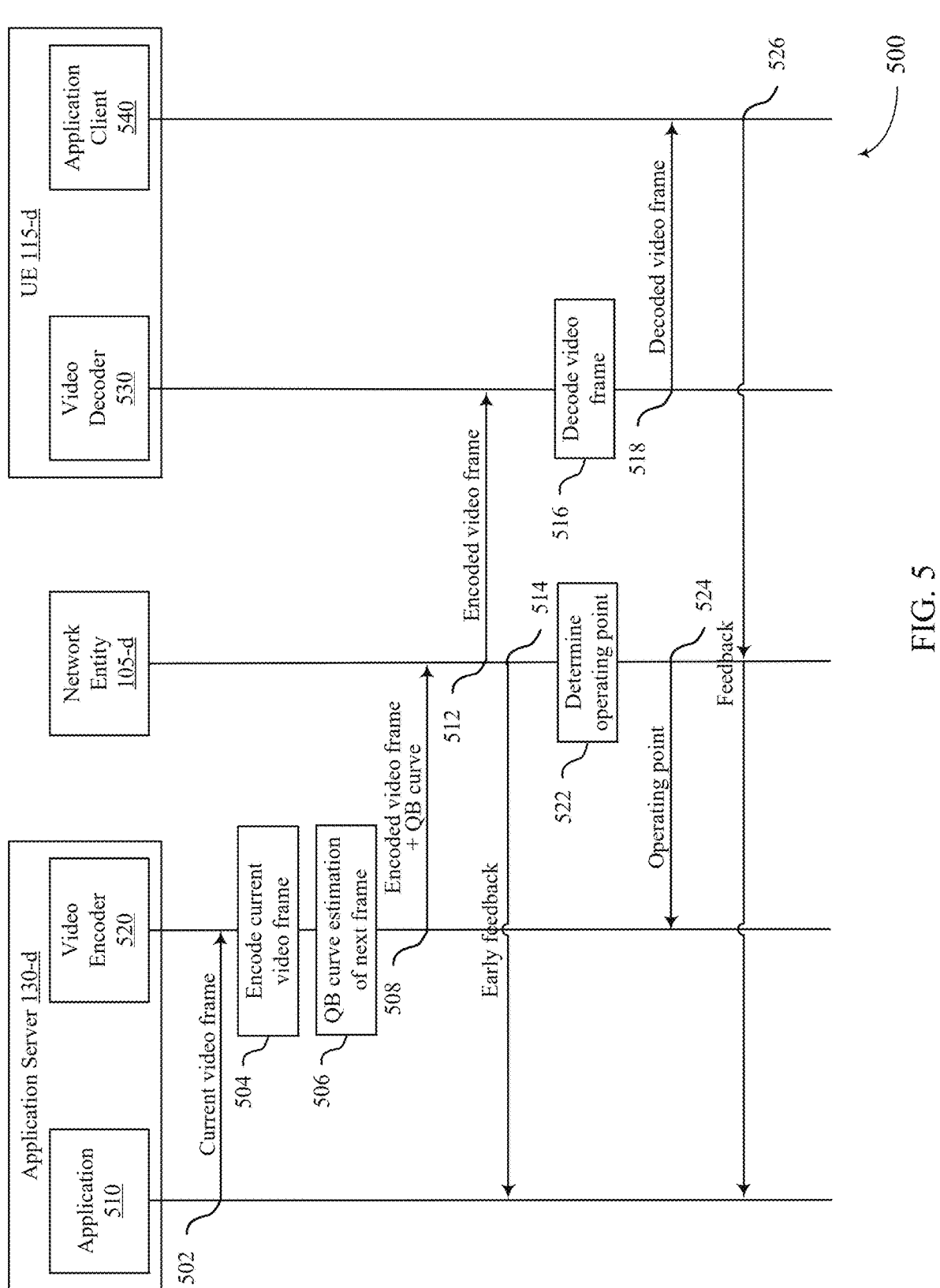
FIG. 5 shows an example of a signal flow that supports video encoding techniques for low latency applications in accordance with one or more aspects of the present disclosure.

FIG. 5 shows an example of a signal flow 500 that supports video encoding techniques for low latency applications in accordance with one or more aspects of the present disclosure. In some examples, signal flow 500 may implement aspects of or may be implemented by aspects of wireless communications systems 100 and 200 and the system architecture 300, described with reference to FIGS. 1 to 3. Signal flow 500 may be implemented by an application server 130-*d*, a network entity 105-*d*, and a UE 115-*d*, which may be examples of similar entities described with reference to FIGS. 1 to 3. The application server 130-*d* may include an application 510 and a video encoder 520. The application 510 may be an example of a video source that provides the video frame 310 described with reference to FIG. 3, and the video encoder 520 may be an example of the video encoder 320 described with reference to FIG. 3. The UE 115-*c* may include a video decoder 530 and an application client 540, which may be examples of the video decoder 330 and application client 340 described with reference to FIG. 3.

In the following description of the signal flow 500, the communications between the various entities may be performed in different orders or at different times. Some operations may also be omitted from the signal flow 500, and other operations may be added to the signal flow 500. In some examples, the operations illustrated in signal flow 500 may be performed by hardware (e.g., including circuitry, processing blocks, logic components, and other components), code (e.g., software or firmware) executed by a processor, or any combination thereof. Alternative examples of the following may be implemented, where some steps are performed in a different order than described or are not performed at all. In some cases, steps may include additional features not mentioned below, or further steps may be added.

At step 502, the application 510 may provide (e.g., send, transmit, etc.), and the video encoder 520 may receive, a video frame (e.g., the video frame 310 of FIG. 3) of a set of video frames (e.g., one or more video frames) associated with a video bitstream to be consumed by the UE 115-*d* (or one or more additional UEs). The video frame may be a current frame (e.g., an upcoming frame to be consumed by the UE 115-*d*). In some cases, the application 510 may, instead, provide some other portion of the video bitstream, such as a video slice, a video segment, or other portion.

At step 504, the video encoder 520 may receive the current video frame (or other portion of the video bitstream) and may encode the current video frame. In this case, the current video frame may be encoded using a bitrate determined based on an estimated QB curve associated with a previous video frame (e.g., a last generated video frame) or an estimated QB curve associated with the most recently-generated frames within a same video segment (e.g., the current video frame and one or more previous video frames within the same video segment). The video encoder 520 may output the encoded current video frame as a PDU set.

At step 506, the video encoder 520 may then estimate a QB curve for encoding the next video frame (e.g., the video frame subsequent to the current video frame). In this case, the QB curve for the next video frame may be estimated based on a complexity associated with the current video frame. For instance, the video encoder 520 may use information output from the motion compensation process when encoding the current video (at step 504) to determine the complexity associated with the current video frame. The video encoder 520 may use the determined complexity associated with the current video frame to estimate a QB curve for encoding the next video frame. This may be useful in the case when the video encoder 520 determines that there is not significant change in complexity from one video frame to another. For instance, the video encoder 520 may determine that a change in video complexity from the previous video frame to the current video frame satisfies (e.g., is below) a threshold. In some cases, the video encoder 520 may estimate the QB curve for the next video frame based on the complexity associated with multiple previously generated video frame (e.g., based on the current video frame and one or more other previous video frames, such as one or more other previous video frames within the same video segment).

At step 508, the video encoder 520 may transmit, and the network entity 105-*d* may receive, the encoded current video frame and an indication of the QB curve for encoding the next video frame. The encoded current video frame may be received as a PDU set.

At step 512, the network entity 105-*d* may send the PDU set corresponding to the encoded current video frame to one or more UEs. For instance, the network entity 105-*d* may transmit, and the video decoder 530 implemented at the UE 115-*d* may receive, the PDU set corresponding to the encoded current video frame.

At step 514, the network entity 105-*d* may provide an early indication of feedback to the application 510. For instance, the network entity 105-*d* may transmit, and the application 510 at the application server 130-*d* may receive, the early indication of feedback. The early indication of feedback may include an indication of successful or unsuccessful delivery of the PDU set to the UE 115-*d*.

At step 516, the video decoder 530 may decode the encoded current video frame.

At step 518, the video decoder 530 may provide (e.g., send, transmit, etc.), and the application client may receive, the decoded video frame.

Meanwhile, (e.g., concurrent with, before, or after any one of steps 508 to 518 or step 526), at step 522, the network entity 105-*d* may utilize the indication of the QB curve for encoding the next video frames to determine an operating point, including an appropriate bitrate for encoding the next video frame. The network entity 105-*d* may further determine the appropriate bitrate based on conditions at the network entity 105-*d*. In some cases, the network entity 105-*d* may further determine the appropriate bitrate for encoding the next video frame based on QB curves associated with one or more other UEs.

At step 524, the network entity 105-*d* may transmit, and the video encoder 520 may receive, the determined operating point for encoding the next video frame. The determined operating point may be utilized by the video encoder 520 at a later time, such as when the video encoder 520 receives the next video frame from the application 510.

At step 526, the application client 540 may provide feedback related to the current video frame to the network entity 105-*d*, the application server 130-*d*, or both. For instance, the application client 540 may transmit feedback, via the network entity 105-*d*, to the application 510 at the application server 130-*d*. The feedback may include an indication of successful or unsuccessful delivery of the current video frame, one or more E2E measurements, such as RTT, error concealment, etc.

Figure 6:
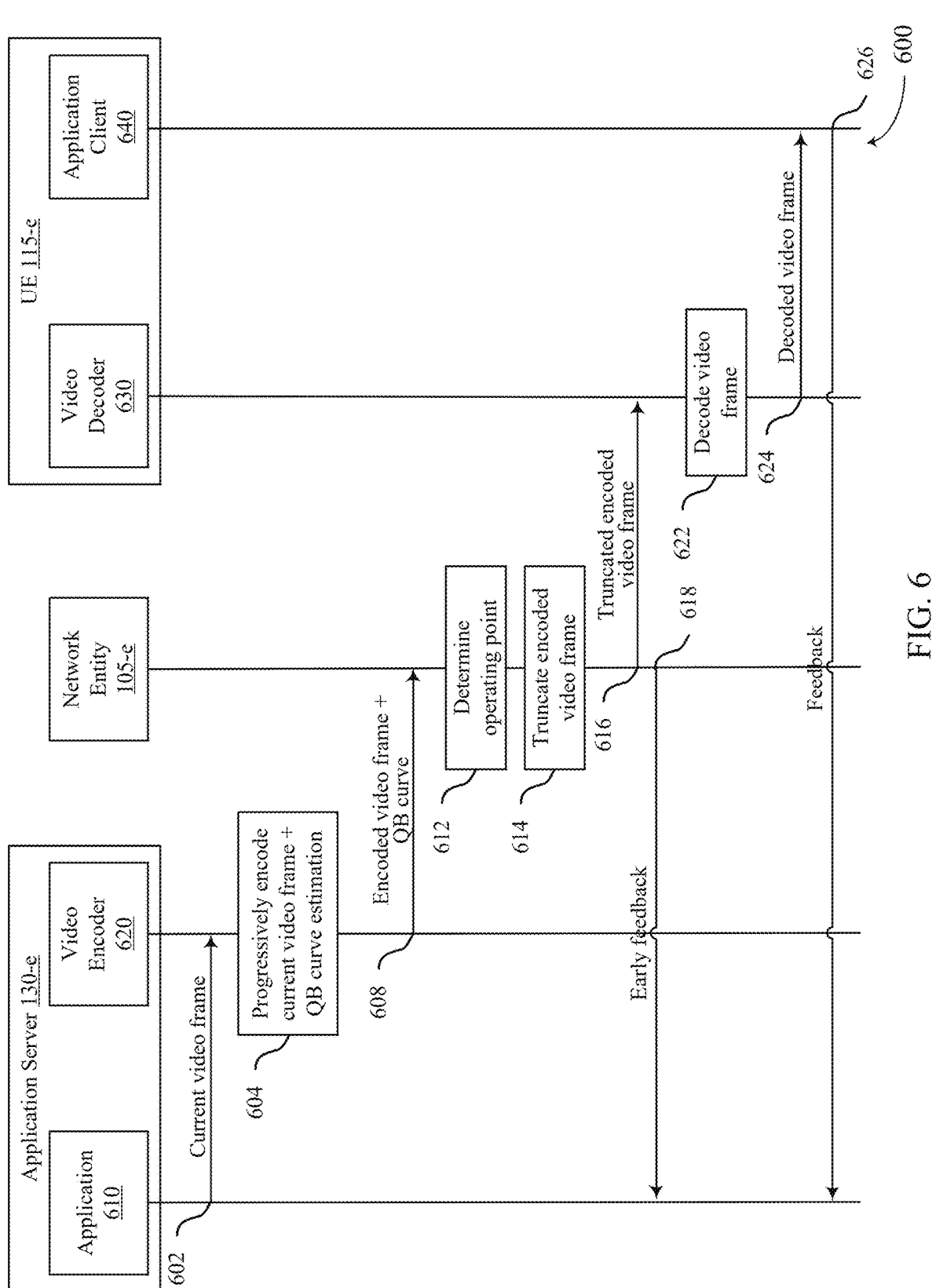
FIG. 6 shows an example of a signal flow that supports video encoding techniques for low latency applications in accordance with one or more aspects of the present disclosure.

FIG. 6 shows an example of a signal flow 600 that supports video encoding techniques for low latency applications in accordance with one or more aspects of the present disclosure. In some examples, signal flow 600 may implement aspects of or may be implemented by aspects of wireless communications systems 100 and 200 and the system architecture 300, described with reference to FIGS. 1 to 3. Signal flow 600 may be implemented by an application server 130-*e*, a network entity 105-*e*, and a UE 115-*e*, which may be examples of similar entities described with reference to FIGS. 1 to 3. The application server 130-*e* may include an application 610 and a video encoder 620. The application 610 may be an example of a video source that provides the video frame 310 described with reference to FIG. 3, and the video encoder 620 may be an example of the video encoder 320 described with reference to FIG. 3. The UE 115-*c* may include a video decoder 630 and an application client 640, which may be examples of the video decoder 330 and application client 340 described with reference to FIG. 3.

In the following description of the signal flow 600, the communications between the various entities may be performed in different orders or at different times. Some operations may also be omitted from the signal flow 600, and other operations may be added to the signal flow 600. In some examples, the operations illustrated in signal flow 600 may be performed by hardware (e.g., including circuitry, processing blocks, logic components, and other components), code (e.g., software or firmware) executed by a processor, or any combination thereof. Alternative examples of the following may be implemented, where some steps are performed in a different order than described or are not performed at all. In some cases, steps may include additional features not mentioned below, or further steps may be added.

At step 602, the application 610 may provide (e.g., send, transmit, etc.), and the video encoder 620 may receive, a video frame (e.g., the video frame 310 of FIG. 3) of a set of video frames (e.g., one or more video frames) associated with a video bitstream to be consumed by the UE 115-*e* (or one or more additional UEs). The video frame may be a current frame (e.g., an upcoming frame to be consumed by the UE 115-*e*). In some cases, the application 610 may, instead, provide some other portion of the video bitstream, such as a video slice, a video segment, or other portion.

At step 604, the video encoder 620 may progressively encode the current video frame. For instance, rather than encoding the video frame based on receiving an operating point from the network entity 105-*d* (such as described with reference to FIGS. 4 and 5), the video encoder 620 may, instead, progressively encode the video frame. Progressively encoding the video frame may involve encoding the video frame in multiple layers, where each layer corresponds to the video frame encoded at a different bitrate. In this case, the video encoder 620 may progressively encode the video frame into multi-layered PDUs. The multi-layered PDU may include a base layer PDU, which may be an encoding of the frame with a minimum amount of quality (e.g., using a first bitrate), and one or more additional PDU layers, where each additional PDU layer may add to the quality of the encoded frame. For instance, each PDU layer may be encoded at a different bitrate. In this way, a decoder, such as the video decoder 630, may only need the base layer PDU to decode the video frame, although the video quality of the decoded video frame may be low. However, with the availability of each additional PDU layer, the quality of the decoded video frame may be increased.

During the progressive encoding of the current video frame, the video encoder 620 may estimate a QB curve for the current video frame. In this case, the QB curve may be estimated based on the bitrate used to encode each of the progressive PDU layers. That is, the QB curve may be defined by QoE values estimated for each of the PDU layers based on the corresponding bitrate used to encode the PDU layer.

At step 608, the video encoder 620 may transmit, and the network entity 105-e may receive, the multi-layered encoded video frame and an indication of the associated QB curve.

At step 612, the network entity 105-e may utilize the QB curve associated with the current video frame to determine an operating point for encoding the current video frame. For instance, the operating point may define one or more parameters, including an appropriate bitrate for encoding the current video frame. The network entity 105-e may further determine the appropriate bitrate based on conditions at the network entity 105-e (e.g., based on server or channel measurements at the network entity 105-e). In some cases, the network entity 105-e may further determine the appropriate bitrate for encoding the current video frame based on QB curves associated with one or more other UEs. However, the network entity 105-e need not send the determined operating point to the video encoder 620. Instead, since the network entity 105-e has all of the PDU layers corresponding to encoding of the video frame at the different bitrates and has determined the appropriate bitrate for encoding the current video frame, the network entity 105-e may adjust a quality associated with the encoded video frame to satisfy the bitrate.

At step 614, the network entity 105-e may truncate the multi-layered encoded video frame by removing (e.g., discarding) one or more layers of the encoded video frame based on the determined operating point (e.g., and corresponding bitrate), radio conditions, congestion, a QoE target, or the like. The resulting truncated encoded video frame may have a minimum quantity of layers (e.g., a subset of layers) sufficient to correspond to the bitrate associated with the determined operating point. In this way, the network entity 105-e may send to the UE 115-e only the quantity of layers needed to correspond to the determined bitrate.

At step 616, the network entity 105-e may send a PDU set corresponding to the truncated encoded video frame to one or more UEs. For instance, the network entity 105-e may transmit, and the video decoder 630 implemented at the UE 115-e may receive, the PDU set corresponding to the truncated encoded video frame.

At step 618, the network entity 105-e may provide an early indication of feedback to the application 610. For instance, the network entity 105-e may transmit, and the application 610 at the application server 130-e may receive, the early indication of feedback. The early indication of feedback may include an indication of successful or unsuccessful delivery of the PDU set to the UE 115-e. In some cases, the feedback may additionally include an indication of a quantity of layers included in the encoded video frame transmitted to the UE 115-e or an indication of a quantity of layers removed from the encoded video frame transmitted to the UE 115-e.

At step 622, the video decoder 630 may decode the encoded video frame.

At step 624, the video decoder 630 may provide (e.g., send, transmit, etc.), and the application client may receive, the decoded video frame.

At step 626, the application client 640 may provide feedback related to the current video frame to the network entity 105-e, the application server 130-e, or both. For instance, the application client 640 may transmit feedback, via the network entity 105-e, to the application 610 at the application server 130-e. The feedback may include an indication of successful or unsuccessful delivery of the current video frame, one or more E2E measurements, such as RTT, error concealment, etc.

Figure 7:
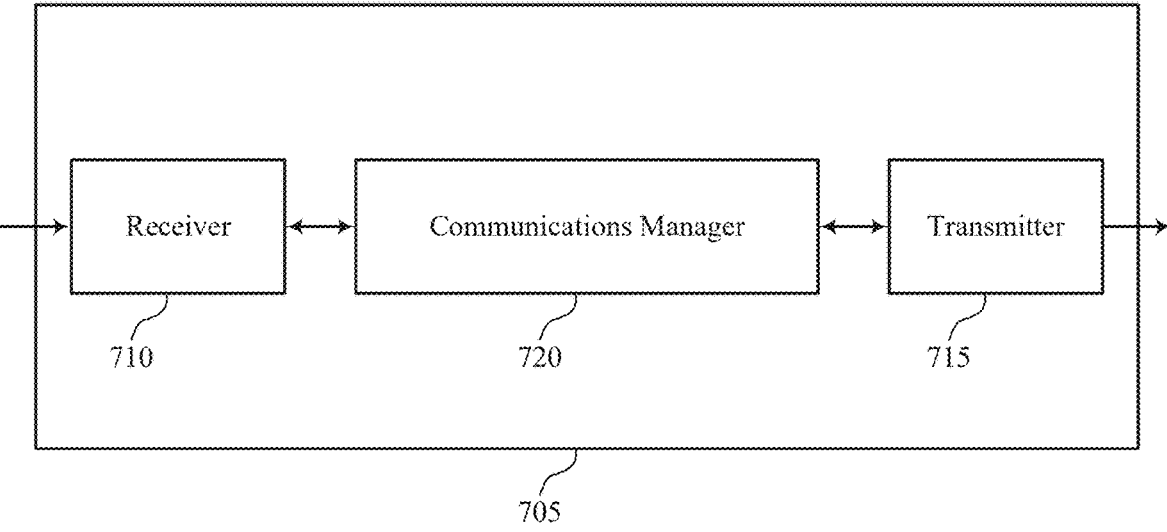
FIGS. 7 and 8 show block diagrams of devices that support video encoding techniques for low latency applications in accordance with one or more aspects of the present disclosure.

FIG. 7 shows a block diagram 700 of a device 705 that supports video encoding techniques for low latency applications in accordance with one or more aspects of the present disclosure. The device 705 may be an example of aspects of a network entity 105 as described herein. The device 705 may include a receiver 710, a transmitter 715, and a communications manager 720. The device 705, or one or more components of the device 705 (e.g., the receiver 710, the transmitter 715, the communications manager 720), may include at least one processor, which may be coupled with at least one memory, to, individually or collectively, support or enable the described techniques. Each of these components may be in communication with one another (e.g., via one or more buses).

The receiver 710 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 705. In some examples, the receiver 710 may support obtaining information by receiving signals via one or more antennas. Additionally, or alternatively, the receiver 710 may support obtaining information by receiving signals via one or more wired (e.g., electrical, fiber optic) interfaces, wireless interfaces, or any combination thereof.

The transmitter 715 may provide a means for outputting (e.g., transmitting, providing, conveying, sending) information generated by other components of the device 705. For example, the transmitter 715 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 715 may support outputting information by transmitting signals via one or more antennas. Additionally, or alternatively, the transmitter 715 may support outputting information by transmitting signals via one or more wired (e.g., electrical, fiber optic) interfaces, wireless interfaces, or any combination thereof. In some examples, the transmitter 715 and the receiver 710 may be co-located in a transceiver, which may include or be coupled with a modem.

The communications manager 720, the receiver 710, the transmitter 715, or various combinations or components thereof may be examples of means for performing various aspects of video encoding techniques for low latency applications as described herein. For example, the communications manager 720, the receiver 710, the transmitter 715, or various combinations or components thereof may be capable of performing one or more of the functions described herein.

In some examples, the communications manager 720, the receiver 710, the transmitter 715, or various combinations or components thereof may be implemented in hardware (e.g., in communications management circuitry). The hardware may include at least one of a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 720, the receiver 710, the transmitter 715, or various combinations or components thereof may be implemented in code (e.g., as communications management software or firmware) executed by at least one processor (e.g., referred to as a processor-executable code). If implemented in code executed by at least one processor, the functions of the communications manager 720, the receiver 710, the transmitter 715, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 720 may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communications in accordance with examples as disclosed herein. For example, the communications manager 720 is capable of, configured to, or operable to support a means for receiving, from a first device, a first message including an indication of a first QB curve associated with a first frame of a set of frames associated with a video stream. The communications manager 720 is capable of, configured to, or operable to support a means for transmitting, to the first device and based on the first QB curve, an operating point for encoding the first frame. The communications manager 720 is capable of, configured to, or operable to support a means for receiving, from the first device, a second message including a first PDU set associated with the encoded first frame, where the encoded first frame is based on the operating point. The communications manager 720 is capable of, configured to, or operable to support a means for transmitting, to one or more UEs, the first PDU set.

By including or configuring the communications manager 720 in accordance with examples as described herein, the device 705 (e.g., at least one processor controlling or otherwise coupled with the receiver 710, the transmitter 715, the communications manager 720, or a combination thereof)

may support techniques for more efficient utilization of communication resources and reduced latency.

Figure 8:
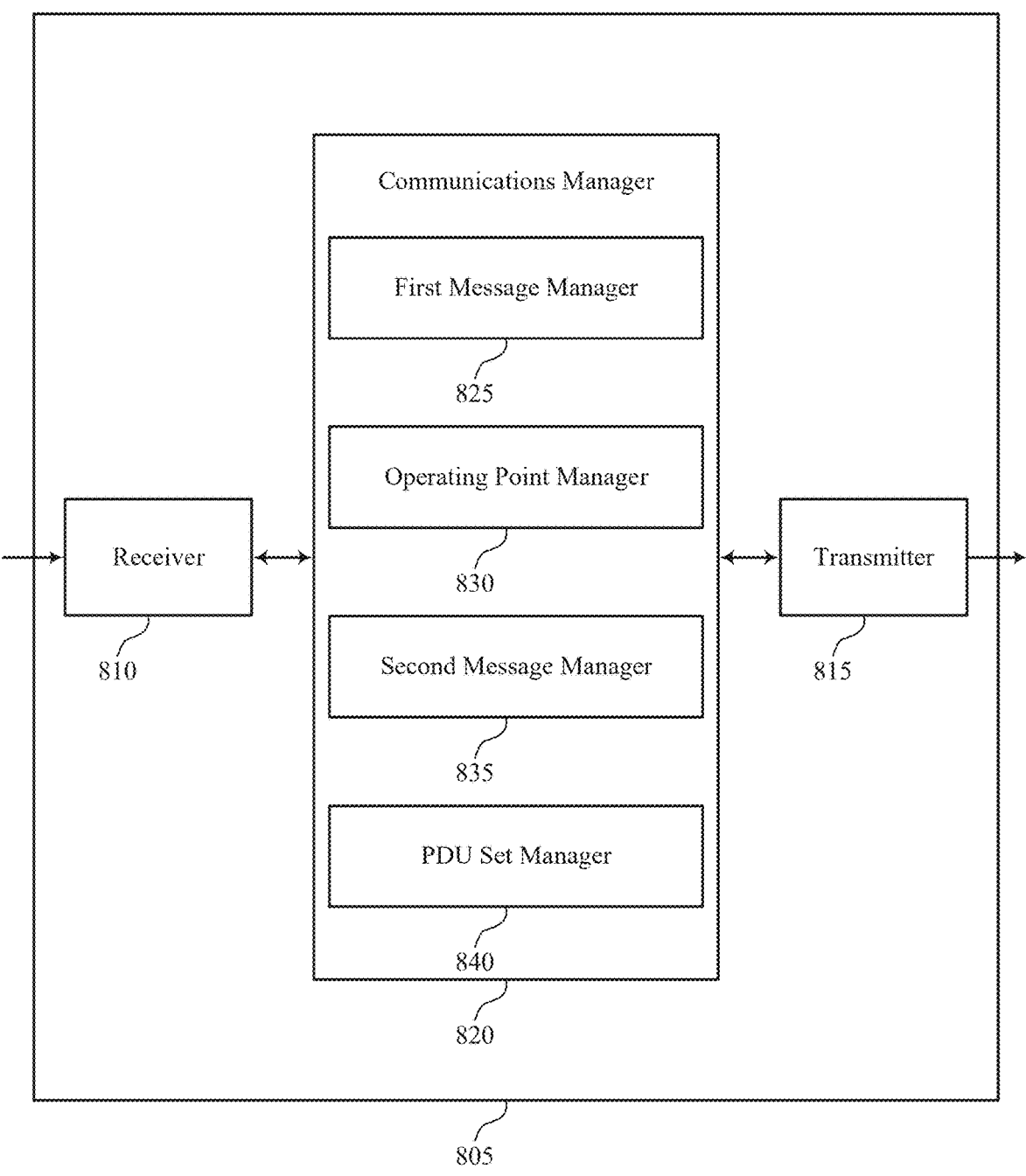

FIG. 8 shows a block diagram 800 of a device 805 that supports video encoding techniques for low latency applications in accordance with one or more aspects of the present disclosure. The device 805 may be an example of aspects of a device 705 or a network entity 105 as described herein. The device 805 may include a receiver 810, a transmitter 815, and a communications manager 820. The device 805, or one or more components of the device 805 (e.g., the receiver 810, the transmitter 815, the communications manager 820), may include at least one processor, which may be coupled with at least one memory, to support the described techniques. Each of these components may be in communication with one another (e.g., via one or more buses).

The receiver 810 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 805. In some examples, the receiver 810 may support obtaining information by receiving signals via one or more antennas. Additionally, or alternatively, the receiver 810 may support obtaining information by receiving signals via one or more wired (e.g., electrical, fiber optic) interfaces, wireless interfaces, or any combination thereof.

The transmitter 815 may provide a means for outputting (e.g., transmitting, providing, conveying, sending) information generated by other components of the device 805. For example, the transmitter 815 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 815 may support outputting information by transmitting signals via one or more antennas. Additionally, or alternatively, the transmitter 815 may support outputting information by transmitting signals via one or more wired (e.g., electrical, fiber optic) interfaces, wireless interfaces, or any combination thereof. In some examples, the transmitter 815 and the receiver 810 may be co-located in a transceiver, which may include or be coupled with a modem.

The device 805, or various components thereof, may be an example of means for performing various aspects of video encoding techniques for low latency applications as described herein. For example, the communications manager 820 may include a first message manager 825, an operating point manager 830, a second message manager 835, a PDU set manager 840, or any combination thereof. The communications manager 820 may be an example of aspects of a communications manager 720 as described herein. In some examples, the communications manager 820, or various components thereof, may be configured to perform various operations (e.g., receiving, obtaining, monitoring, outputting, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to obtain information, output information, or perform various other operations as described herein.

The communications manager 820 may support wireless communications in accordance with examples as disclosed herein. The first message manager 825 is capable of, configured to, or operable to support a means for receiving, from a first device, a first message including an indication of a first QB curve associated with a first frame of a set of frames associated with a video stream. The operating point manager 830 is capable of, configured to, or operable to support a means for transmitting, to the first device and based on the first QB curve, an operating point for encoding the first frame. The second message manager 835 is capable of, configured to, or operable to support a means for receiving, from the first device, a second message including a first PDU set associated with the encoded first frame, where the encoded first frame is based on the operating point. The PDU set manager 840 is capable of, configured to, or operable to support a means for transmitting, to one or more UEs, the first PDU set.

Figure 9:
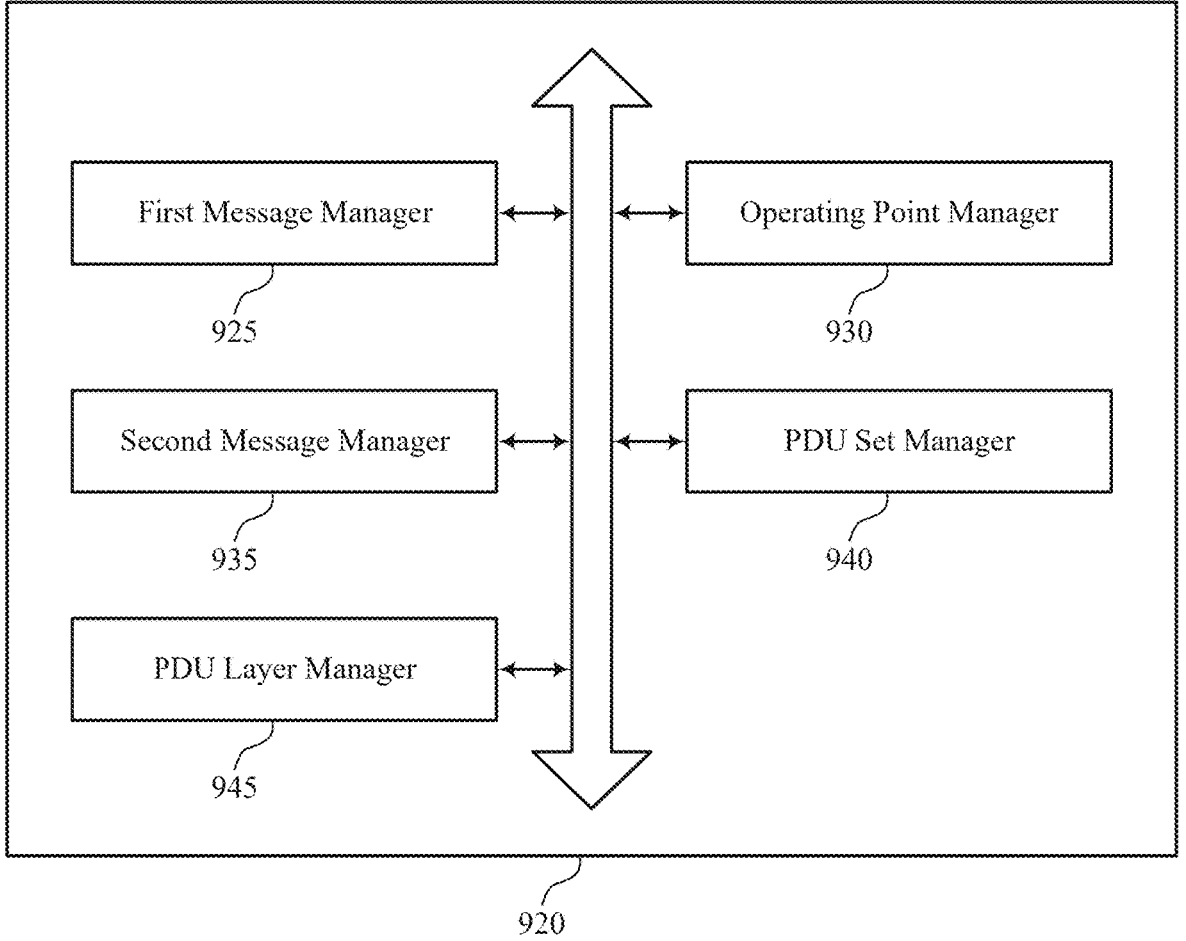
FIG. 9 shows a block diagram of a communications manager that supports video encoding techniques for low latency applications in accordance with one or more aspects of the present disclosure.

FIG. 9 shows a block diagram 900 of a communications manager 920 that supports video encoding techniques for low latency applications in accordance with one or more aspects of the present disclosure. The communications manager 920 may be an example of aspects of a communications manager 720, a communications manager 820, or both, as described herein. The communications manager 920, or various components thereof, may be an example of means for performing various aspects of video encoding techniques for low latency applications as described herein. For example, the communications manager 920 may include a first message manager 925, an operating point manager 930, a second message manager 935, a PDU set manager 940, a PDU layer manager 945, or any combination thereof. Each of these components, or components or subcomponents thereof (e.g., one or more processors, one or more memories), may communicate, directly or indirectly, with one another (e.g., via one or more buses). The communications may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 920 may support wireless communications in accordance with examples as disclosed herein. The first message manager 925 is capable of, configured to, or operable to support a means for receiving, from a first device, a first message including an indication of a first QB curve associated with a first frame of a set of frames associated with a video stream. The operating point manager 930 is capable of, configured to, or operable to support a means for transmitting, to the first device and based on the first QB curve, an operating point for encoding the first frame. The second message manager 935 is capable of, configured to, or operable to support a means for receiving, from the first device, a second message including a first PDU set associated with the encoded first frame, where the encoded first frame is based on the operating point. The PDU set manager 940 is capable of, configured to, or operable to support a means for transmitting, to one or more UEs, the first PDU set.

In some examples, the first frame is a current frame. In some examples, the first QB curve is associated with the current frame. In some examples, the first PDU set included in the second message is associated with the current frame.

In some examples, the first frame is a next frame after a current frame. In some examples, the first QB curve is associated with the next frame. In some examples, the first message further includes a second PDU set associated with the current frame. In some examples, the first PDU set included in the second message is associated with the next frame. In some examples, the second message further includes an indication of a second QB curve associated with a subsequent frame after the next frame.

In some examples, first QB curve associated with the next frame is estimated based on a last generated frame.

In some examples, the first frame is associated with a first segment of the video stream. In some examples, the first QB curve associated with the next frame is estimated based on one or more most recent generated frames within the first segment.

In some examples, the first frame is a progressively-encoded current frame. In some examples, the first QB curve is associated with the progressively-encoded current frame. In some examples, the first message further includes a second PDU set associated with the progressively-encoded current frame. In some examples, the first PDU set included in the second message is associated with a progressively-encoded next frame. In some examples, the second message further includes an indication of a second QB curve associated with the progressively-encoded next frame.

In some examples, the progressively-encoded current frame includes a set of multiple PDU layers.

In some examples, the set of multiple PDU layers include a base PDU layer and one or more additional PDU layers. In some examples, each of the one or more additional PDU layers is associated with an increased level of quality relative to a previous PDU layer of the set of multiple PDU layers.

In some examples, the PDU layer manager 945 is capable of, configured to, or operable to support a means for truncating, based on the first QB curve, the progressively-encoded current frame to remove one or more of the set of multiple PDU layers. In some examples, the PDU set manager 940 is capable of, configured to, or operable to support a means for transmitting, to at least one UE of the one or more UEs, the truncated progressively-encoded current frame.

In some examples, the progressively-encoded current frame is truncated based on channel conditions associated with the network entity or a QoE target associated with the at least one UE.

In some examples, the PDU layer manager 945 is capable of, configured to, or operable to support a means for transmitting, to the first device, an indication of a quantity of PDU layers included in the truncated progressively-encoded current frame.

In some examples, the first QB curve is based on complexity information associated with the first frame.

In some examples, the first QB curve is based on one or more QoE metrics corresponding to a set of multiple encoding bitrates for encoding the first frame.

In some examples, the one or more QoE metrics include is a PSNR, a SSIM, a VMAF, or a MOS.

In some examples, a respective QB curve is received for each frame of the set of frames, for each segment of the video stream, or based on a scene change in the video stream.

In some examples, the first device includes an application server or a UE.

Figure 10:
FIG. 10 shows a diagram of a system including a device that supports video encoding techniques for low latency applications in accordance with one or more aspects of the present disclosure.

FIG. 10 shows a diagram of a system 1000 including a device 1005 that supports video encoding techniques for low latency applications in accordance with one or more aspects of the present disclosure. The device 1005 may be an example of or include components of a device 705, a device 805, or a network entity 105 as described herein. The device 1005 may communicate with other network devices or network equipment such as one or more of the network entities 105, UEs 115, or any combination thereof. The communications may include communications over one or more wired interfaces, over one or more wireless interfaces, or any combination thereof. The device 1005 may include components that support outputting and obtaining communications, such as a communications manager 1020, a transceiver 1010, one or more antennas 1015, at least one memory 1025, code 1030, and at least one processor 1035. These components may be in electronic communication or otherwise coupled (e.g., operatively, communicatively, functionally, electronically, electrically) via one or more buses (e.g., a bus 1040).

The transceiver 1010 may support bi-directional communications via wired links, wireless links, or both as described herein. In some examples, the transceiver 1010 may include a wired transceiver and may communicate bi-directionally with another wired transceiver. Additionally, or alternatively, in some examples, the transceiver 1010 may include a wireless transceiver and may communicate bi-directionally with another wireless transceiver. In some examples, the device 1005 may include one or more antennas 1015, which may be capable of transmitting or receiving wireless transmissions (e.g., concurrently). The transceiver 1010 may also include a modem to modulate signals, to provide the modulated signals for transmission (e.g., by one or more antennas 1015, by a wired transmitter), to receive modulated signals (e.g., from one or more antennas 1015, from a wired receiver), and to demodulate signals. In some implementations, the transceiver 1010 may include one or more interfaces, such as one or more interfaces coupled with the one or more antennas 1015 that are configured to support various receiving or obtaining operations, or one or more interfaces coupled with the one or more antennas 1015 that are configured to support various transmitting or outputting operations, or a combination thereof. In some implementations, the transceiver 1010 may include or be configured for coupling with one or more processors or one or more memory components that are operable to perform or support operations based on received or obtained information or signals, or to generate information or other signals for transmission or other outputting, or any combination thereof. In some implementations, the transceiver 1010, or the transceiver 1010 and the one or more antennas 1015, or the transceiver 1010 and the one or more antennas 1015 and one or more processors or one or more memory components (e.g., the at least one processor 1035, the at least one memory 1025, or both), may be included in a chip or chip assembly that is installed in the device 1005. In some examples, the transceiver 1010 may be operable to support communications via one or more communications links (e.g., communication link(s) 125, backhaul communication link(s) 120, a midhaul communication link 162, a fronthaul communication link 168).

The at least one memory 1025 may include RAM, ROM, or any combination thereof. The at least one memory 1025 may store computer-readable, computer-executable, or processor-executable code, such as the code 1030. The code 1030 may include instructions that, when executed by one or more of the at least one processor 1035, cause the device 1005 to perform various functions described herein. The code 1030 may be stored in a non-transitory computer-readable medium such as system memory or another type of memory. In some cases, the code 1030 may not be directly executable by a processor of the at least one processor 1035 but may cause a computer (e.g., when compiled and executed) to perform functions described herein. In some cases, the at least one memory 1025 may include, among other things, a BIOS which may control basic hardware or software operation such as the interaction with peripheral components or devices. In some examples, the at least one processor 1035 may include multiple processors and the at least one memory 1025 may include multiple memories. One or more of the multiple processors may be coupled with one or more of the multiple memories which may, individually or collectively, be configured to perform various functions herein (for example, as part of a processing system).

The at least one processor 1035 may include one or more intelligent hardware devices (e.g., one or more general-purpose processors, one or more DSPs, one or more CPUs, one or more graphics processing units (GPUs), one or more neural processing units (NPUs) (also referred to as neural network processors or deep learning processors (DLPs)), one or more microcontrollers, one or more ASICs, one or more FPGAs, one or more programmable logic devices, discrete gate or transistor logic, one or more discrete hardware components, or any combination thereof). In some cases, the at least one processor 1035 may be configured to operate a memory array using a memory controller. In some other cases, a memory controller may be integrated into one or more of the at least one processor 1035. The at least one processor 1035 may be configured to execute computer-readable instructions stored in a memory (e.g., one or more of the at least one memory 1025) to cause the device 1005 to perform various functions (e.g., functions or tasks supporting video encoding techniques for low latency applications). For example, the device 1005 or a component of the device 1005 may include at least one processor 1035 and at least one memory 1025 coupled with one or more of the at least one processor 1035, the at least one processor 1035 and the at least one memory 1025 configured to perform various functions described herein. The at least one processor 1035 may be an example of a cloud-computing platform (e.g., one or more physical nodes and supporting software such as operating systems, virtual machines, or container instances) that may host the functions (e.g., by executing code 1030) to perform the functions of the device 1005. The at least one processor 1035 may be any one or more suitable processors capable of executing scripts or instructions of one or more software programs stored in the device 1005 (such as within one or more of the at least one memory 1025).

In some examples, the at least one processor 1035 may include multiple processors and the at least one memory 1025 may include multiple memories. One or more of the multiple processors may be coupled with one or more of the multiple memories, which may, individually or collectively, be configured to perform various functions herein. In some examples, the at least one processor 1035 may be a component of a processing system, which may refer to a system (such as a series) of machines, circuitry (including, for example, one or both of processor circuitry (which may include the at least one processor 1035) and memory circuitry (which may include the at least one memory 1025)), or components, that receives or obtains inputs and processes the inputs to produce, generate, or obtain a set of outputs. The processing system may be configured to perform one or more of the functions described herein. For example, the at least one processor 1035 or a processing system including the at least one processor 1035 may be configured to, configurable to, or operable to cause the device 1005 to perform one or more of the functions described herein.

Further, as described herein, being "configured to," being "configurable to," and being "operable to" may be used interchangeably and may be associated with a capability, when executing code stored in the at least one memory 1025 or otherwise, to perform one or more of the functions described herein.

In some examples, a bus 1040 may support communications of (e.g., within) a protocol layer of a protocol stack. In some examples, a bus 1040 may support communications associated with a logical channel of a protocol stack (e.g., between protocol layers of a protocol stack), which may include communications performed within a component of the device 1005, or between different components of the device 1005 that may be co-located or located in different locations (e.g., where the device 1005 may refer to a system in which one or more of the communications manager 1020, the transceiver 1010, the at least one memory 1025, the code 1030, and the at least one processor 1035 may be located in one of the different components or divided between different components).

In some examples, the communications manager 1020 may manage aspects of communications with a core network 130 (e.g., via one or more wired or wireless backhaul links). For example, the communications manager 1020 may manage the transfer of data communications for client devices, such as one or more UEs 115. In some examples, the communications manager 1020 may manage communications with one or more other network entities 105, and may include a controller or scheduler for controlling communications with UEs 115 (e.g., in cooperation with the one or more other network devices). In some examples, the communications manager 1020 may support an X2 interface within an LTE/LTE-A wireless communications network technology to provide communication between network entities 105.

The communications manager 1020 may support wireless communications in accordance with examples as disclosed herein. For example, the communications manager 1020 is capable of, configured to, or operable to support a means for receiving, from a first device, a first message including an indication of a first QB curve associated with a first frame of a set of frames associated with a video stream. The communications manager 1020 is capable of, configured to, or operable to support a means for transmitting, to the first device and based on the first QB curve, an operating point for encoding the first frame. The communications manager 1020 is capable of, configured to, or operable to support a means for receiving, from the first device, a second message including a first PDU set associated with the encoded first frame, where the encoded first frame is based on the operating point. The communications manager 1020 is capable of, configured to, or operable to support a means for transmitting, to one or more UEs, the first PDU set.

By including or configuring the communications manager 1020 in accordance with examples as described herein, the device 1005 may support techniques for reduced latency, more efficient utilization of communication resources, improved coordination between devices, and improved utilization of processing capability.

In some examples, the communications manager 1020 may be configured to perform various operations (e.g., receiving, obtaining, monitoring, outputting, transmitting) using or otherwise in cooperation with the transceiver 1010, the one or more antennas 1015 (e.g., where applicable), or any combination thereof. Although the communications manager 1020 is illustrated as a separate component, in some examples, one or more functions described with reference to the communications manager 1020 may be supported by or performed by the transceiver 1010, one or more of the at least one processor 1035, one or more of the at least one memory 1025, the code 1030, or any combination thereof (for example, by a processing system including at least a portion of the at least one processor 1035, the at least one memory 1025, the code 1030, or any combination thereof). For example, the code 1030 may include instructions executable by one or more of the at least one processor 1035 to cause the device 1005 to perform various aspects of video encoding techniques for low latency applications as described herein, or the at least one processor 1035 and the at least one memory 1025 may be otherwise configured to, individually or collectively, perform or support such operations.

Figure 11:
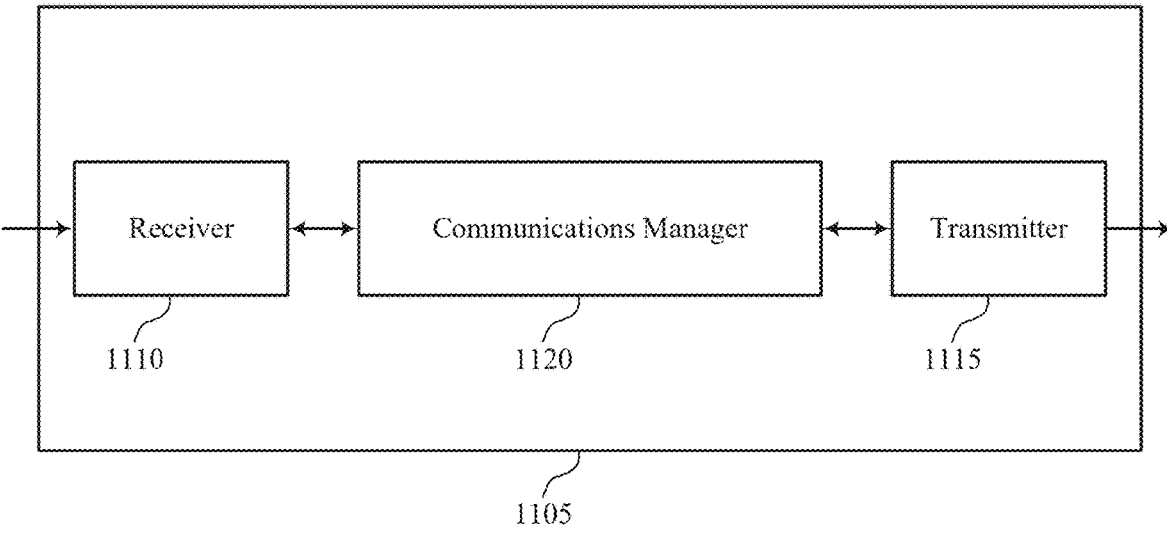
FIGS. 11 and 12 show block diagrams of devices that support video encoding techniques for low latency applications in accordance with one or more aspects of the present disclosure.

FIG. 11 shows a block diagram 1100 of a device 1105 that supports video encoding techniques for low latency applications in accordance with one or more aspects of the present disclosure. The device 1105 may be an example of aspects of a UE 115 as described herein. The device 1105 may include a receiver 1110, a transmitter 1115, and a communications manager 1120. The device 1105, or one or more components of the device 1105 (e.g., the receiver 1110, the transmitter 1115, the communications manager 1120), may include at least one processor, which may be coupled with at least one memory, to, individually or collectively, support or enable the described techniques. Each of these components may be in communication with one another (e.g., via one or more buses).

The receiver 1110 may provide a means for receiving information such as packets, user data, control information, or any combination thereof associated with various information channels (e.g., control channels, data channels, information channels related to video encoding techniques for low latency applications). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to video encoding techniques for low latency applications). In some examples, the transmitter 1115 may be co-located with a receiver 1110 in a transceiver module. The transmitter 1115 may utilize a single antenna or a set of multiple antennas.

The communications manager 1120, the receiver 1110, the transmitter 1115, or various combinations or components thereof may be examples of means for performing various aspects of video encoding techniques for low latency applications as described herein. For example, the communications manager 1120, the receiver 1110, the transmitter 1115, or various combinations or components thereof may be capable of performing one or more of the functions described herein.

In some examples, the communications manager 1120, the receiver 1110, the transmitter 1115, or various combinations or components thereof may be implemented in hardware (e.g., in communications management circuitry). The hardware may include at least one of a processor, a DSP, a CPU, an ASIC, an FPGA or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 1120, the receiver 1110, the transmitter 1115, or various combinations or components thereof may be implemented in code (e.g., as communications management software or firmware) executed by at least one processor (e.g., referred to as a processor-executable code). If implemented in code executed by at least one processor, the functions of the communications manager 1120, the receiver 1110, the transmitter 1115, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 1120 may be configured to perform various operations (e.g., receiving, obtaining, monitoring, outputting, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to obtain information, output information, or perform various other operations as described herein.

The communications manager 1120 may support wireless communications in accordance with examples as disclosed herein. For example, the communications manager 1120 is capable of, configured to, or operable to support a means for transmitting, to a network entity, a first message including an indication of a first QB curve associated with a first frame of a set of frames associated with a video stream. The communications manager 1120 is capable of, configured to, or operable to support a means for receiving, from the network entity and based on the first QB curve, an operating point for encoding the first frame. The communications manager 1120 is capable of, configured to, or operable to support a means for encoding, based on the operating point, the first frame. The communications manager 1120 is capable of, configured to, or operable to support a means for transmitting, to the network entity, a second message including a first PDU set associated with the encoded first frame.

By including or configuring the communications manager 1120 in accordance with examples as described herein, the device 1105 (e.g., at least one processor controlling or otherwise coupled with the receiver 1110, the transmitter 1115, the communications manager 1120, or a combination thereof) may support techniques for more efficient utilization of communication resources and reduced latency.

Figure 12:
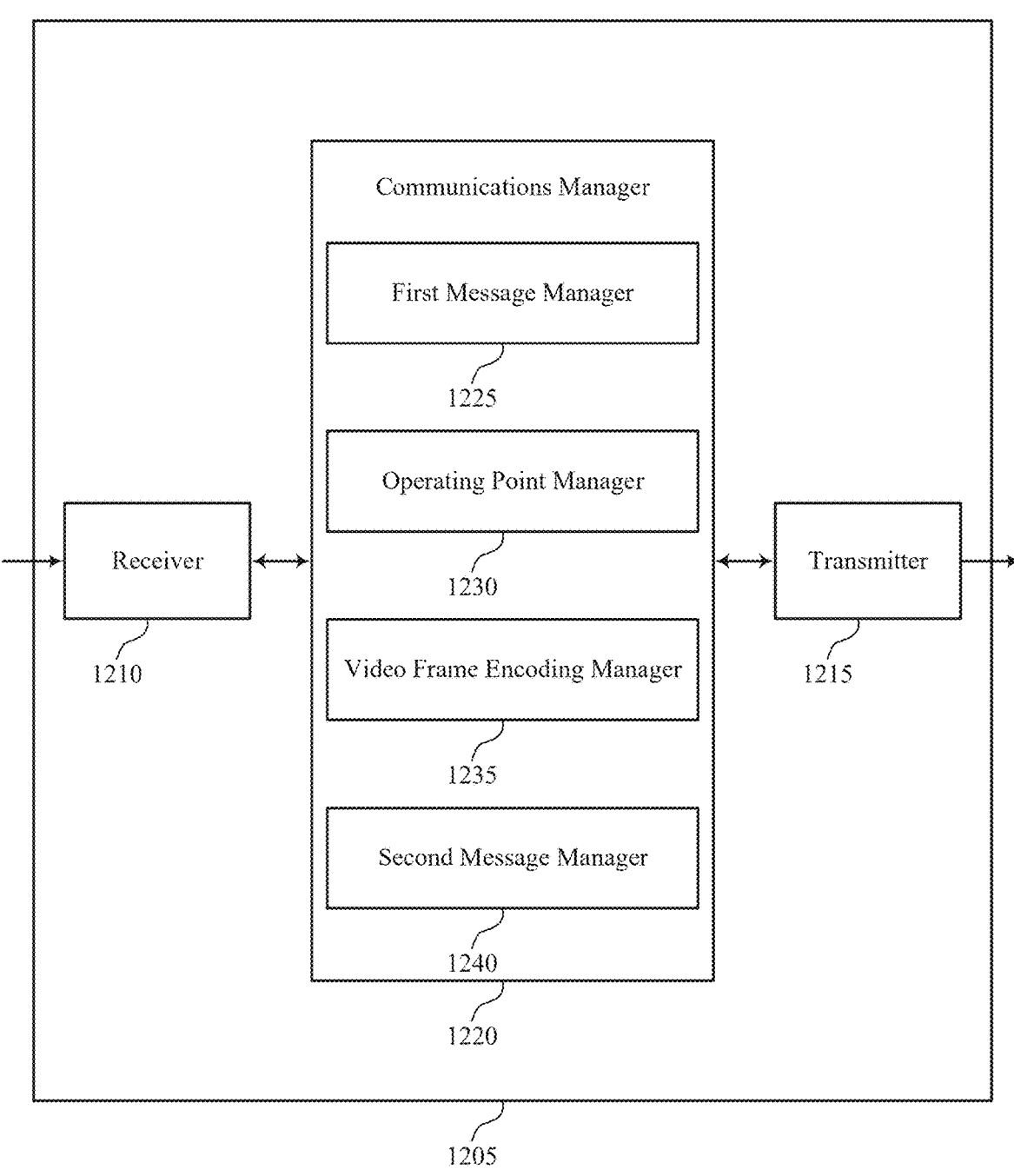

FIG. 12 shows a block diagram 1200 of a device 1205 that supports video encoding techniques for low latency applications in accordance with one or more aspects of the present disclosure. The device 1205 may be an example of aspects of a device 1105 or a UE 115 as described herein. The device 1205 may include a receiver 1210, a transmitter 1215, and a communications manager 1220. The device 1205, or one or more components of the device 1205 (e.g., the receiver 1210, the transmitter 1215, the communications manager 1220), may include at least one processor, which may be coupled with at least one memory, to support the described techniques. Each of these components may be in communication with one another (e.g., via one or more buses).

The receiver 1210 may provide a means for receiving information such as packets, user data, control information, or any combination thereof associated with various information channels (e.g., control channels, data channels, information channels related to video encoding techniques for low latency applications). Information may be passed on to other components of the device 1205. The receiver 1210 may utilize a single antenna or a set of multiple antennas.

The transmitter 1215 may provide a means for transmitting signals generated by other components of the device 1205. For example, the transmitter 1215 may transmit information such as packets, user data, control information, or any combination thereof associated with various information channels (e.g., control channels, data channels, information channels related to video encoding techniques for low latency applications). In some examples, the transmitter 1215 may be co-located with a receiver 1210 in a transceiver module. The transmitter 1215 may utilize a single antenna or a set of multiple antennas.

The device 1205, or various components thereof, may be an example of means for performing various aspects of video encoding techniques for low latency applications as described herein. For example, the communications manager 1220 may include a first message manager 1225, an operating point manager 1230, a video frame encoding manager 1235, a second message manager 1240, or any combination thereof. The communications manager 1220 may be an example of aspects of a communications manager 1120 as described herein. In some examples, the communications manager 1220, or various components thereof, may be configured to perform various operations (e.g., receiving, obtaining, monitoring, outputting, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to obtain information, output information, or perform various other operations as described herein.

The communications manager 1220 may support wireless communications in accordance with examples as disclosed herein. The first message manager 1225 is capable of, configured to, or operable to support a means for transmitting, to a network entity, a first message including an indication of a first QB curve associated with a first frame of a set of frames associated with a video stream. The operating point manager 1230 is capable of, configured to, or operable to support a means for receiving, from the network entity and based on the first QB curve, an operating point for encoding the first frame. The video frame encoding manager 1235 is capable of, configured to, or operable to support a means for encoding, based on the operating point, the first frame. The second message manager 1240 is capable of, configured to, or operable to support a means for transmitting, to the network entity, a second message including a first PDU set associated with the encoded first frame.

Figure 13:
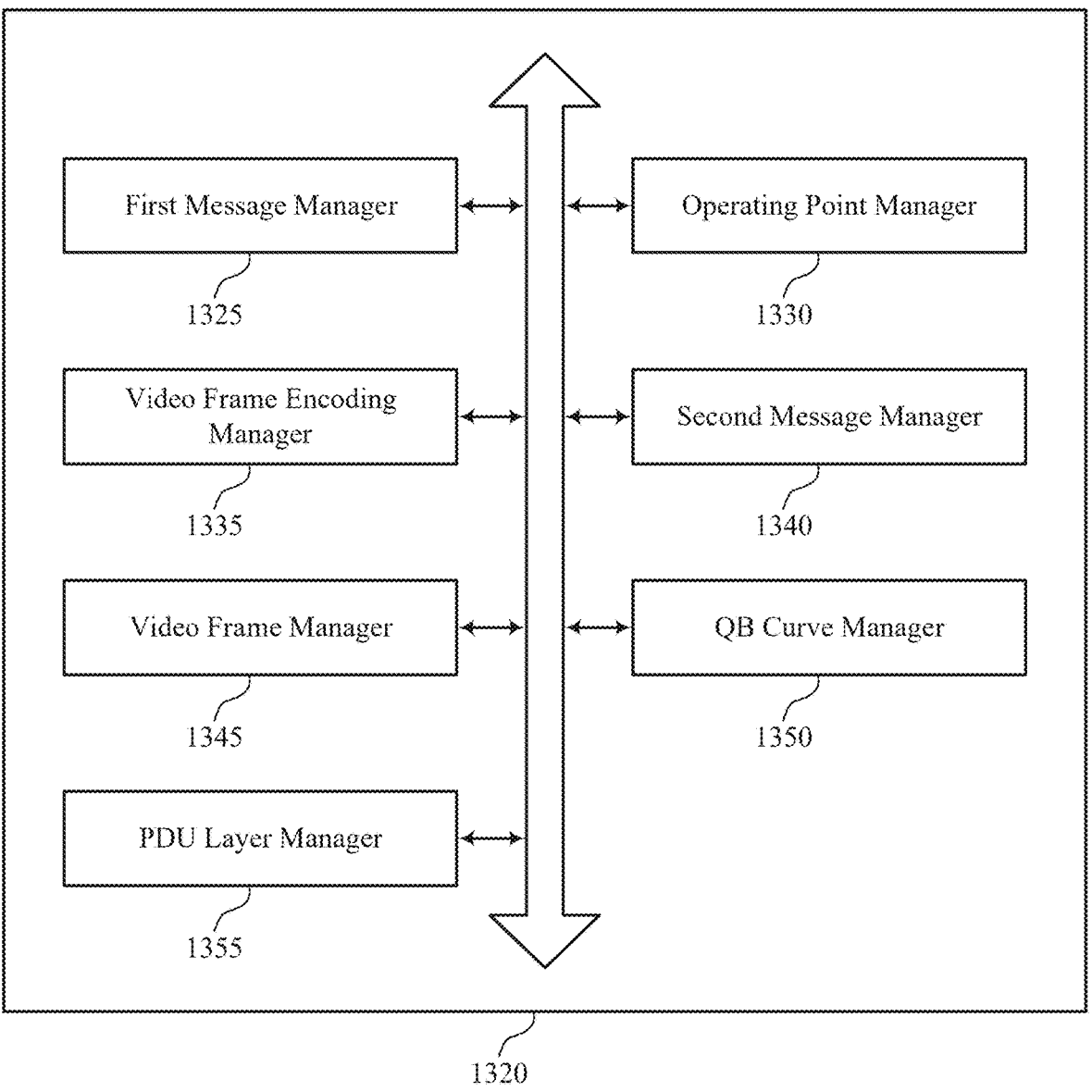
FIG. 13 shows a block diagram of a communications manager that supports video encoding techniques for low latency applications in accordance with one or more aspects of the present disclosure.

FIG. 13 shows a block diagram 1300 of a communications manager 1320 that supports video encoding techniques for low latency applications in accordance with one or more aspects of the present disclosure. The communications manager 1320 may be an example of aspects of a communications manager 1120, a communications manager 1220, or both, as described herein. The communications manager 1320, or various components thereof, may be an example of means for performing various aspects of video encoding techniques for low latency applications as described herein. For example, the communications manager 1320 may include a first message manager 1325, an operating point manager 1330, a video frame encoding manager 1335, a second message manager 1340, a video frame manager 1345, a QB curve manager 1350, a PDU layer manager 1355, or any combination thereof. Each of these components, or components or subcomponents thereof (e.g., one or more processors, one or more memories), may communicate, directly or indirectly, with one another (e.g., via one or more buses).

The communications manager 1320 may support wireless communications in accordance with examples as disclosed herein. The first message manager 1325 is capable of, configured to, or operable to support a means for transmitting, to a network entity, a first message including an indication of a first QB curve associated with a first frame of a set of frames associated with a video stream. The operating point manager 1330 is capable of, configured to, or operable to support a means for receiving, from the network entity and based on the first QB curve, an operating point for encoding the first frame. The video frame encoding manager 1335 is capable of, configured to, or operable to support a means for encoding, based on the operating point, the first frame. The second message manager 1340 is capable of, configured to, or operable to support a means for transmitting, to the network entity, a second message including a first PDU set associated with the encoded first frame.

In some examples, the first frame is a current frame. In some examples, the first QB curve is associated with the current frame. In some examples, the first PDU set included in the second message is associated with the current frame.

In some examples, the video frame encoding manager 1335 is capable of, configured to, or operable to support a means for encoding a current frame. In some examples, to support transmitting the first message, the first message manager 1325 is capable of, configured to, or operable to support a means for transmitting the first message including: a second PDU set associated with the encoded current frame, and the indication of the first QB curve, where the first QB curve is associated with a next frame after the current frame. In some examples, to support encoding the first frame, the video frame encoding manager 1335 is capable of, configured to, or operable to support a means for encoding the next frame. In some examples, to support transmitting the second message, the second message manager 1340 is capable of, configured to, or operable to support a means for transmitting the second message including: the first PDU set, where the first PDU set is associated with the encoded next frame, and an indication of a second QB curve associated with a subsequent frame after the next frame.

In some examples, first QB curve associated with the next frame is estimated based on a last generated frame.

In some examples, the first frame is associated with a first segment of the video stream. In some examples, first QB curve associated with the next frame is estimated based on one or more most recent generated frames within the first segment.

In some examples, to support encoding the first frame, the video frame encoding manager 1335 is capable of, configured to, or operable to support a means for progressively encoding a current frame. In some examples, to support transmitting the first message, the first message manager 1325 is capable of, configured to, or operable to support a means for transmitting the first message including: a second PDU set associated with the progressively-encoded current frame, and the indication of the first QB curve, where the first QB curve is associated with the progressively-encoded current frame. In some examples, to support transmitting the second message, the second message manager 1340 is capable of, configured to, or operable to support a means for transmitting the second message including: the first PDU set, where the first PDU set is associated with a progressively-encoded next frame, and an indication of the second QB curve associated with the progressively-encoded next frame.

In some examples, the progressively-encoded current frame includes a set of multiple PDU layers.

In some examples, the set of multiple PDU layers includes a base PDU layer and one or more additional PDU layers. In some examples, to support progressively encoding the current frame, the PDU layer manager 1355 is capable of, configured to, or operable to support a means for encoding the base PDU layer with a minimum level of quality and encoding each of the one or more additional PDU layers with an increased level of quality relative to a previous PDU layer of the set of multiple PDU layers.

In some examples, the PDU layer manager 1355 is capable of, configured to, or operable to support a means for receiving, from the network entity, an indication of a quantity of PDU layers included in the progressively-encoded current frame after one or more PDU layers are truncated by the network entity.

In some examples, the first QB curve is based on complexity information associated with the first frame.

In some examples, the video frame manager 1345 is capable of, configured to, or operable to support a means for receiving, from an application, the first frame. In some examples, the QB curve manager 1350 is capable of, configured to, or operable to support a means for estimating, based on one or more QoE metrics corresponding to a set of multiple encoding bitrates for encoding the first frame, the first QB curve.

In some examples, the one or more QoE metrics include is a PSNR, a SSIM, a VMAF, or a MOS.

In some examples, the QB curve manager 1350 is capable of, configured to, or operable to support a means for estimating a QB curve for each frame of the set of frames, for each segment of the video stream, or based on a scene change in the video stream.

In some examples, the first device includes an application server or a UE.

Figure 14:
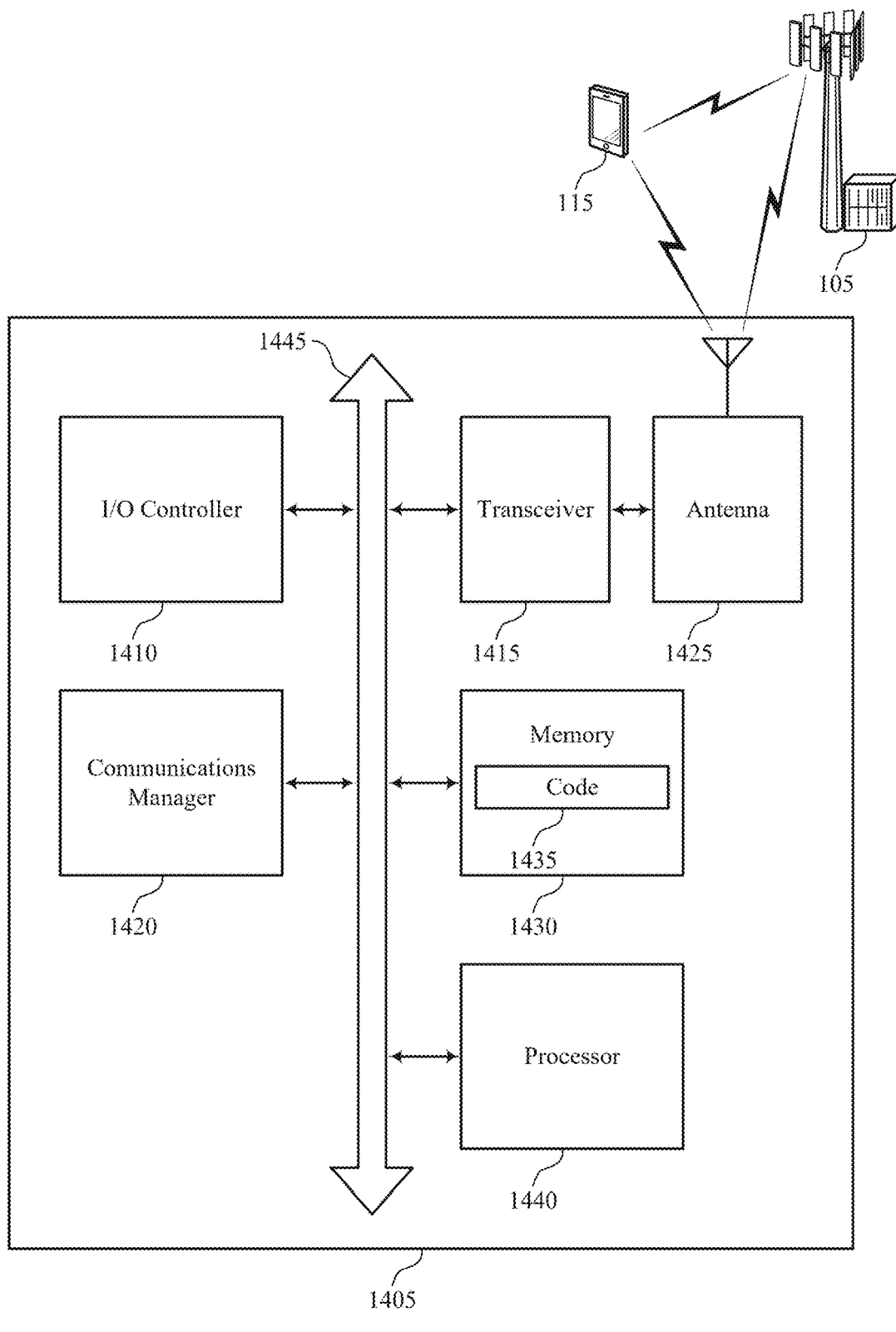
FIG. 14 shows a diagram of a system including a device that supports video encoding techniques for low latency applications in accordance with one or more aspects of the present disclosure.

FIG. 14 shows a diagram of a system 1400 including a device 1405 that supports video encoding techniques for low latency applications in accordance with one or more aspects of the present disclosure. The device 1405 may be an example of or include components of a device 1105, a device 1205, or a UE 115 as described herein. The device 1405 may communicate (e.g., wirelessly) with one or more other devices (e.g., network entities 105, UEs 115, or a combination thereof). The device 1405 may include components for bi-directional voice and data communications including components for transmitting and receiving communications, such as a communications manager 1420, an input/output (I/O) controller, such as an I/O controller 1410, a transceiver 1415, one or more antennas 1425, at least one memory 1430, code 1435, and at least one processor 1440. These components may be in electronic communication or otherwise coupled (e.g., operatively, communicatively, functionally, electronically, electrically) via one or more buses (e.g., a bus 1445).

The I/O controller 1410 may manage input and output signals for the device 1405. The I/O controller 1410 may also manage peripherals not integrated into the device 1405. In some cases, the I/O controller 1410 may represent a physical connection or port to an external peripheral. In some cases, the I/O controller 1410 may utilize an operating system such as iOS®, ANDROID®, MS-DOS®, MS-WIN-DOWS®, OS/2®, UNIX®, LINUX®, or another known operating system. Additionally, or alternatively, the I/O controller 1410 may represent or interact with a modem, a keyboard, a mouse, a touchscreen, or a similar device. In some cases, the I/O controller 1410 may be implemented as part of one or more processors, such as the at least one processor 1440. In some cases, a user may interact with the device 1405 via the I/O controller 1410 or via hardware components controlled by the I/O controller 1410.

In some cases, the device 1405 may include a single antenna. However, in some other cases, the device 1405 may have more than one antenna, which may be capable of concurrently transmitting or receiving multiple wireless transmissions. The transceiver 1415 may communicate bi-directionally via the one or more antennas 1425 using wired or wireless links as described herein. For example, the transceiver 1415 may represent a wireless transceiver and may communicate bi-directionally with another wireless transceiver. The transceiver 1415 may also include a modem to modulate the packets, to provide the modulated packets to one or more antennas 1425 for transmission, and to demodulate packets received from the one or more antennas 1425. The transceiver 1415, or the transceiver 1415 and one or more antennas 1425, may be an example of a transmitter 1115, a transmitter 1215, a receiver 1110, a receiver 1210, or any combination thereof or component thereof, as described herein.

The at least one memory 1430 may include random access memory (RAM) and read-only memory (ROM). The at least one memory 1430 may store computer-readable, computer-executable, or processor-executable code, such as the code 1435. The code 1435 may include instructions that, when executed by the at least one processor 1440, cause the device 1405 to perform various functions described herein. The code 1435 may be stored in a non-transitory computer-readable medium such as system memory or another type of memory. In some cases, the code 1435 may not be directly executable by the at least one processor 1440 but may cause a computer (e.g., when compiled and executed) to perform functions described herein. In some cases, the at least one memory 1430 may include, among other things, a basic I/O system (BIOS) which may control basic hardware or software operation such as the interaction with peripheral components or devices.

The at least one processor 1440 may include one or more intelligent hardware devices (e.g., one or more general-purpose processors, one or more DSPs, one or more CPUs, one or more GPUs, one or more NPUs (also referred to as neural network processors or DLPs), one or more micro-controllers, one or more ASICs, one or more FPGAs, one or more programmable logic devices, discrete gate or transistor logic, one or more discrete hardware components, or any combination thereof). In some cases, the at least one processor 1440 may be configured to operate a memory array using a memory controller. In some other cases, a memory controller may be integrated into the at least one processor 1440. The at least one processor 1440 may be configured to execute computer-readable instructions stored in a memory (e.g., the at least one memory 1430) to cause the device 1405 to perform various functions (e.g., functions or tasks supporting video encoding techniques for low latency applications). For example, the device 1405 or a component of the device 1405 may include at least one processor 1440 and at least one memory 1430 coupled with or to the at least one processor 1440, the at least one processor 1440 and the at least one memory 1430 configured to perform various functions described herein.

In some examples, the at least one processor 1440 may include multiple processors and the at least one memory 1430 may include multiple memories. One or more of the multiple processors may be coupled with one or more of the multiple memories, which may, individually or collectively, be configured to perform various functions described herein. In some examples, the at least one processor 1440 may be a component of a processing system, which may refer to a system (such as a series) of machines, circuitry (including, for example, one or both of processor circuitry (which may include the at least one processor 1440) and memory circuitry (which may include the at least one memory 1430)), or components, that receives or obtains inputs and processes the inputs to produce, generate, or obtain a set of outputs. The processing system may be configured to perform one or more of the functions described herein. For example, the at least one processor 1440 or a processing system including the at least one processor 1440 may be configured to, configurable to, or operable to cause the device 1405 to perform one or more of the functions described herein. Further, as described herein, being "configured to," being "configurable to," and being "operable to" may be used interchangeably and may be associated with a capability, when executing code 1435 (e.g., processor-executable code) stored in the at least one memory 1430 or otherwise, to perform one or more of the functions described herein.

The communications manager 1420 may support wireless communications in accordance with examples as disclosed herein. For example, the communications manager 1420 is capable of, configured to, or operable to support a means for transmitting, to a network entity, a first message including an indication of a first QB curve associated with a first frame of a set of frames associated with a video stream. The communications manager 1420 is capable of, configured to, or operable to support a means for receiving, from the network entity and based on the first QB curve, an operating point for encoding the first frame. The communications manager 1420 is capable of, configured to, or operable to support a means for encoding, based on the operating point, the first frame. The communications manager 1420 is capable of, configured to, or operable to support a means for transmitting, to the network entity, a second message including a first PDU set associated with the encoded first frame.

By including or configuring the communications manager 1420 in accordance with examples as described herein, the device 1405 may support techniques for reduced latency, more efficient utilization of communication resources, improved coordination between devices, and improved utilization of processing capability.

In some examples, the communications manager 1420 may be configured to perform various operations (e.g., receiving, monitoring, transmitting) using or otherwise in cooperation with the transceiver 1415, the one or more antennas 1425, or any combination thereof. Although the communications manager 1420 is illustrated as a separate component, in some examples, one or more functions described with reference to the communications manager 1420 may be supported by or performed by the at least one processor 1440, the at least one memory 1430, the code 1435, or any combination thereof. For example, the code 1435 may include instructions executable by the at least one processor 1440 to cause the device 1405 to perform various aspects of video encoding techniques for low latency applications as described herein, or the at least one processor 1440 and the at least one memory 1430 may be otherwise configured to, individually or collectively, perform or support such operations.

FIG. 15 shows a flowchart illustrating a method 1500 that supports video encoding techniques for low latency applications in accordance with one or more aspects of the present disclosure. The operations of the method 1500 may be implemented by a network entity or its components as described herein. For example, the operations of the method 1500 may be performed by a network entity as described with reference to FIGS. 1 through 10. In some examples, a network entity may execute a set of instructions to control the functional elements of the network entity to perform the described functions. Additionally, or alternatively, the network entity may perform aspects of the described functions using special-purpose hardware.

At 1505, the method may include receiving, from a first device, a first message including an indication of a first QB curve associated with a first frame of a set of frames associated with a video stream. The operations of 1505 may be performed in accordance with examples as disclosed herein. In some examples, aspects of the operations of 1505 may be performed by a first message manager 925 as described with reference to FIG. 9.

At 1510, the method may include transmitting, to the first device and based on the first QB curve, an operating point for encoding the first frame. The operations of 1510 may be performed in accordance with examples as disclosed herein. In some examples, aspects of the operations of 1510 may be performed by an operating point manager 930 as described with reference to FIG. 9.

At 1515, the method may include receiving, from the first device, a second message including a first PDU set associated with the encoded first frame based on the operating point. The operations of 1515 may be performed in accordance with examples as disclosed herein. In some examples, aspects of the operations of 1515 may be performed by a second message manager 935 as described with reference to FIG. 9.

At 1520, the method may include transmitting, to one or more UEs, the first PDU set. The operations of 1520 may be performed in accordance with examples as disclosed herein. In some examples, aspects of the operations of 1520 may be performed by a PDU set manager 940 as described with reference to FIG. 9.

FIG. 16 shows a flowchart illustrating a method 1600 that supports video encoding techniques for low latency applications in accordance with one or more aspects of the present disclosure. The operations of the method 1600 may be implemented by a UE or its components as described herein. For example, the operations of the method 1600 may be performed by a UE 115 as described with reference to FIGS. 1 through 6 and 11 through 14. In some examples, a UE may execute a set of instructions to control the functional elements of the UE to perform the described functions. Additionally, or alternatively, the UE may perform aspects of the described functions using special-purpose hardware.

At 1605, the method may include transmitting, to a network entity, a first message including an indication of a first QB curve associated with a first frame of a set of frames associated with a video stream. The operations of 1605 may be performed in accordance with examples as disclosed herein. In some examples, aspects of the operations of 1605 may be performed by a first message manager 1325 as described with reference to FIG. 13.

At 1610, the method may include receiving, from the network entity and based on the first QB curve, an operating point for encoding the first frame. The operations of 1610 may be performed in accordance with examples as disclosed herein. In some examples, aspects of the operations of 1610 may be performed by an operating point manager 1330 as described with reference to FIG. 13.

At 1615, the method may include encoding, based on the operating point, the first frame. The operations of 1615 may be performed in accordance with examples as disclosed herein. In some examples, aspects of the operations of 1615 may be performed by a video frame encoding manager 1335 as described with reference to FIG. 13.

At 1620, the method may include transmitting, to the network entity, a second message including a first PDU set associated with the encoded first frame. The operations of 1620 may be performed in accordance with examples as disclosed herein. In some examples, aspects of the operations of 1620 may be performed by a second message manager 1340 as described with reference to FIG. 13.

The following provides an overview of aspects of the present disclosure:

Aspect 1: A method for wireless communications by a network entity, comprising: receiving, from a first device, a first message comprising an indication of a first QB curve associated with a first frame of a set of frames associated with a video stream; transmitting, to the first device and based at least in part on the first QB curve, an operating point for encoding the first frame; receiving, from the first device, a second message comprising a first PDU set associated with the encoded first frame, wherein the encoded first frame is based at least in part on the operating point; and transmitting, to one or more UEs, the first PDU set.

Aspect 2: The method of aspect 1, wherein the first frame is a current frame, the first QB curve is associated with the current frame, and the first PDU set included in the second message is associated with the current frame.

Aspect 3: The method of any of aspects 1 through 2, wherein the first frame is a next frame after a current frame, the first QB curve is associated with the next frame, the first message further comprises a second PDU set associated with the current frame, the first PDU set included in the second message is associated with the next frame, and the second message further comprises an indication of a second QB curve associated with a subsequent frame after the next frame.

Aspect 4: The method of aspect 3, wherein the first QB curve associated with the next frame is estimated based at least in part on a last generated frame.

Aspect 5: The method of any of aspects 3 through 4, wherein the first frame is associated with a first segment of the video stream, and the first QB curve associated with the next frame is estimated based at least in part on one or more most recent generated frames within the first segment.

Aspect 6: The method of any of aspects 1 through 5, wherein the first frame is a progressively-encoded current frame, the first QB curve is associated with the progressively-encoded current frame, the first message further comprises a second PDU set associated with the progressively-encoded current frame, the first PDU set included in the second message is associated with a progressively-encoded next frame, and the second message further comprises an indication of a second QB curve associated with the progressively-encoded next frame.

Aspect 7: The method of aspect 6, wherein the progressively-encoded current frame comprises a plurality of PDU layers.

Aspect 8: The method of aspect 7, wherein the plurality of PDU layers comprise a base PDU layer and one or more additional PDU layers, and each of the one or more additional PDU layers is associated with an increased level of quality relative to a previous PDU layer of the plurality of PDU layers.

Aspect 9: The method of any of aspects 7 through 8, further comprising: truncating, based at least in part on the first QB curve, the progressively-encoded current frame to remove one or more of the plurality of PDU layers, wherein transmitting the first PDU set associated with the encoded first frame comprises transmitting, to at least one UE of the one or more UEs, the truncated progressively-encoded current frame.

Aspect 10: The method of aspect 9, wherein the progressively-encoded current frame is truncated based at least in part on channel conditions associated with the network entity or a QoE target associated with the at least one UE.

Aspect 11: The method of any of aspects 9 through 10, further comprising: transmitting, to the first device, an indication of a quantity of PDU layers included in the truncated progressively-encoded current frame.

Aspect 12: The method of any of aspects 1 through 11, wherein the first QB curve is based at least in part on complexity information associated with the first frame.

Aspect 13: The method of any of aspects 1 through 12, wherein the first QB curve is based at least in part on one or more QoE metrics corresponding to a plurality of encoding bitrates for encoding the first frame.

Aspect 14: The method of aspect 13, wherein the one or more QoE metrics comprise is a PSNR, a SSIM, a VMAF, or a MOS.

Aspect 15: The method of any of aspects 1 through 14, wherein a respective QB curve is received for each frame of the set of frames, for each segment of the video stream, or based at least in part on a scene change in the video stream.

Aspect 16: The method of any of aspects 1 through 15, wherein the first device comprises an application server or a UE.

Aspect 17: A method for wireless communications by a first device, comprising: transmitting, to a network entity, a first message comprising an indication of a first QB curve associated with a first frame of a set of frames associated with a video stream; receiving, from the network entity and based at least in part on the first QB curve, an operating point for encoding the first frame; encoding, based at least in part on the operating point, the first frame; and transmitting, to the network entity, a second message comprising a first PDU set associated with the encoded first frame.

Aspect 18: The method of aspect 17, wherein the first frame is a current frame, the first QB curve is associated with the current frame, and the first PDU set included in the second message is associated with the current frame.

Aspect 19: The method of any of aspects 17 through 18, further comprising: encoding a current frame, wherein transmitting the first message comprises transmitting the first message comprises: a second PDU set associated with the encoded current frame, and the indication of the first QB curve, wherein the first QB curve is associated with a next frame after the current frame, wherein encoding the first frame comprises encoding the next frame, and wherein transmitting the second message comprises transmitting the second message comprising: the first PDU set, wherein the first PDU set is associated with the encoded next frame, and an indication of a second QB curve associated with a subsequent frame after the next frame.

Aspect 20: The method of aspect 19, wherein the first QB curve associated with the next frame is estimated based at least in part on a last generated frame.

Aspect 21: The method of any of aspects 19 through 20, wherein the first frame is associated with a first segment of the video stream, and the first QB curve associated with the next frame is estimated based at least in part on one or more most recent generated frames within the first segment.

Aspect 22: The method of any of aspects 17 through 21, wherein encoding the first frame comprises: progressively encoding a current frame, wherein transmitting the first message comprises transmitting the first message comprising: a second PDU set associated with the progressively-encoded current frame, and the indication of the first QB curve, wherein the first QB curve is associated with the progressively-encoded current frame, and wherein transmitting the second message comprises transmitting the second message comprising: the first PDU set, wherein the first PDU set is associated with a progressively-encoded next frame, and an indication of the second QB curve associated with the progressively-encoded next frame.

Aspect 23: The method of aspect 22, wherein the progressively-encoded current frame comprises a plurality of PDU layers.

Aspect 24: The method of aspect 23, wherein the plurality of PDU layers comprise a base PDU layer and one or more additional PDU layers, and wherein progressively encoding the current frame comprises: encoding the base PDU layer with a minimum level of quality; and encoding each of the one or more additional PDU layers with an increased level of quality relative to a previous PDU layer of the plurality of PDU layers.

Aspect 25: The method of any of aspects 22 through 24, further comprising: receiving, from the network entity, an indication of a quantity of PDU layers included in the progressively-encoded current frame after one or more PDU layers are truncated by the network entity.

Aspect 26: The method of any of aspects 17 through 25, wherein the first QB curve is based at least in part on complexity information associated with the first frame.

Aspect 27: The method of any of aspects 17 through 26, further comprising: receiving, from an application, the first frame; and estimating, based at least in part on one or more QoE metrics corresponding to a plurality of encoding bitrates for encoding the first frame, the first QB curve.

Aspect 28: The method of aspect 27, wherein the one or more QoE metrics comprise is a PSNR, a SSIM, a VMAF, or a MOS.

Aspect 29: The method of any of aspects 17 through 28, further comprising: estimating a QB curve for each frame of the set of frames, for each segment of the video stream, or based on a scene change in the video stream.

Aspect 30: The method of any of aspects 17 through 29, wherein the first device comprises an application server or a UE.

Aspect 31: A network entity for wireless communications, comprising one or more memories storing processor-executable code, and one or more processors coupled with the one or more memories and individually or collectively operable to execute the code to cause the network entity to perform a method of any of aspects 1 through 16.

Aspect 32: A network entity for wireless communications, comprising at least one means for performing a method of any of aspects 1 through 16.

Aspect 33: A non-transitory computer-readable medium storing code for wireless communications, the code comprising instructions executable by one or more processors to perform a method of any of aspects 1 through 16.

Aspect 34: A first device for wireless communications, comprising one or more memories storing processor-executable code, and one or more processors coupled with the one or more memories and individually or collectively operable to execute the code to cause the first device to perform a method of any of aspects 17 through 30.

Aspect 35: A first device for wireless communications, comprising at least one means for performing a method of any of aspects 17 through 30.

Aspect 36: A non-transitory computer-readable medium storing code for wireless communications, the code comprising instructions executable by one or more processors to perform a method of any of aspects 17 through 30.

It should be noted that the methods described herein describe possible implementations. The operations and the steps may be rearranged or otherwise modified and other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, a GPU, a NPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Any functions or operations described herein as being capable of being performed by a processor may be performed by multiple processors that, individually or collectively, are capable of performing the described functions or operations.

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk, and Blu-ray disc. Disks may reproduce data magnetically, and discs may reproduce data optically using lasers. Combinations of the above are also included within the scope of computer-readable media. Any functions or operations described herein as being capable of being performed by a memory may be performed by multiple memories that, individually or collectively, are capable of performing the described functions or operations.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, the article "a" before a noun is open-ended and understood to refer to "at least one" of those nouns or "one or more" of those nouns. Thus, the terms "a," "at least one," "one or more," and "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

The term "determine" or "determining" encompasses a variety of actions and, therefore, "determining" can include calculating, computing, processing, deriving, investigating, looking up (such as via looking up in a table, a database, or another data structure), ascertaining, and the like. Also, "determining" can include receiving (e.g., receiving information), accessing (e.g., accessing data stored in memory), and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label or other subsequent reference label.

The description set forth herein, in connection with the appended drawings, describes example configurations and does not represent all the examples that may be implemented or that are within the scope of the claims. The term "example" used herein means "serving as an example, instance, or illustration" and not "preferred" or "advantageous over other examples." The detailed description includes specific details for the purpose of providing an understanding of the described techniques. These techniques, however, may be practiced without these specific details. In some figures, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A network entity, comprising:
one or more memories storing processor-executable code; and
one or more processors coupled with the one or more memories and individually or collectively operable to execute the code to cause the network entity to:
receive, from a first device, a first message comprising an indication of a first quality of experience (QoE)-bitrate (QB) curve associated with a first frame of a set of frames associated with a video stream;

48 transmit, to the first device and based at least in part on the first QB curve, an operating point for encoding the first frame;
receive, from the first device, a second message comprising a first packet data unit (PDU) set associated with the encoded first frame, wherein the encoded first frame is based at least in part on the operating point; and
transmit, to one or more user equipments (UEs), the first PDU set.

2. The network entity of claim 1, wherein:
the first frame is a current frame,
the first QB curve is associated with the current frame, and
the first PDU set included in the second message is associated with the current frame.

3. The network entity of claim 1, wherein:
the first frame is a next frame after a current frame,
the first QB curve is associated with the next frame,
the first message further comprises a second PDU set associated with the current frame,
the first PDU set included in the second message is associated with the next frame, and
the second message further comprises an indication of a second QB curve associated with a subsequent frame after the next frame.

4. The network entity of claim 3, wherein the first QB curve associated with the next frame is estimated based at least in part on a last generated frame.

5. The network entity of claim 3, wherein:
the first frame is associated with a first segment of the video stream, and
the first QB curve associated with the next frame is estimated based at least in part on one or more most recent generated frames within the first segment.

6. The network entity of claim 1, wherein:
the first frame is a progressively-encoded current frame,
the first QB curve is associated with the progressively-encoded current frame,
the first message further comprises a second PDU set associated with the progressively-encoded current frame,
the first PDU set included in the second message is associated with a progressively-encoded next frame, and
the second message further comprises an indication of a second QB curve associated with the progressively-encoded next frame.

7. The network entity of claim 6, wherein the progressively-encoded current frame comprises a plurality of PDU layers.

8. The network entity of claim 7, wherein:
the plurality of PDU layers comprise a base PDU layer and one or more additional PDU layers, and
each of the one or more additional PDU layers is associated with an increased level of quality relative to a previous PDU layer of the plurality of PDU layers.

9. The network entity of claim 7, wherein the one or more processors are individually or collectively further operable to execute the code to cause the network entity to:
truncate, based at least in part on the first QB curve, the progressively-encoded current frame to remove one or more of the plurality of PDU layers,
wherein, to transmit the first PDU set associated with the encoded first frame, the one or more processors are individually or collectively operable to execute the code to cause the network entity to transmit, to at least one UE of the one or more UEs, the truncated progressively-encoded current frame.

10. The network entity of claim 9, wherein the progressively-encoded current frame is truncated based at least in part on channel conditions associated with the network entity or a QoE target associated with the at least one UE.

11. The network entity of claim 9, wherein the one or more processors are individually or collectively further operable to execute the code to cause the network entity to:
transmit, to the first device, an indication of a quantity of PDU layers included in the truncated progressively-encoded current frame.

12. The network entity of claim 1, wherein the first QB curve is based at least in part on complexity information associated with the first frame.

13. The network entity of claim 1, wherein the first QB curve is based at least in part on one or more QoE metrics corresponding to a plurality of encoding bitrates for encoding the first frame.

14. The network entity of claim 13, wherein the one or more QoE metrics comprise is a peak signal-to-noise ratio (PSNR), a structural similarity index (SSIM), a video multimethod assessment fusion (VMAF), or a mean opinion score (MOS).

15. The network entity of claim 1, wherein a respective QB curve is received for each frame of the set of frames, for each segment of the video stream, or based at least in part on a scene change in the video stream.

16. A first device, comprising:
one or more memories storing processor-executable code; and
one or more processors coupled with the one or more memories and individually or collectively operable to execute the code to cause the first device to:
transmit, to a network entity, a first message comprising an indication of a first quality of experience (QoE)-bitrate (QB) curve associated with a first frame of a set of frames associated with a video stream;
receive, from the network entity and based at least in part on the first QB curve, an operating point for encoding the first frame;
encode, based at least in part on the operating point, the first frame; and
transmit, to the network entity, a second message comprising a first packet data unit (PDU) set associated with the encoded first frame.

17. The first device of claim 16, wherein:
the first frame is a current frame,
the first QB curve is associated with the current frame, and
the first PDU set included in the second message is associated with the current frame.

18. The first device of claim 16, wherein the one or more processors are individually or collectively further operable to execute the code to cause the first device to:
encode a current frame,
wherein, to transmit the first message, the one or more processors are individually or collectively operable to execute the code to cause the first device to transmit the first message comprising:
a second PDU set associated with the encoded current frame, and
the indication of the first QB curve, wherein the first QB curve is associated with a next frame after the current frame, wherein, to encode the first frame, the one or more processors are individually or collectively operable to execute the code to cause the first device to encode the next frame, and
wherein, to transmit the second message, the one or more processors are individually or collectively operable to execute the code to cause the first device to transmit the second message comprising:
the first PDU set, wherein the first PDU set is associated with the encoded next frame, and
an indication of a second QB curve associated with a subsequent frame after the next frame.

19. The first device of claim 18, wherein the first QB curve associated with the next frame is estimated based at least in part on a last generated frame.

20. The first device of claim 18, wherein:
the first frame is associated with a first segment of the video stream, and
the first QB curve associated with the next frame is estimated based at least in part on one or more most recent generated frames within the first segment.

21. The first device of claim 16, wherein, to encode the first frame, the one or more processors are individually or collectively operable to execute the code to cause the first device to progressively encode a current frame,
wherein, to transmit the first message, the one or more processors are individually or collectively operable to execute the code to cause the first device to transmit the first message comprising:
a second PDU set associated with the progressively-encoded current frame, and
the indication of the first QB curve, wherein the first QB curve is associated with the progressively-encoded current frame, and
wherein, to transmit the second message, the one or more processors are individually or collectively operable to execute the code to cause the first device to transmit the second message comprising:
the first PDU set, wherein the first PDU set is associated with a progressively-encoded next frame, and
an indication of the second QB curve associated with the progressively-encoded next frame.

22. The first device of claim 21, wherein the progressively-encoded current frame comprises a plurality of PDU layers.

23. The first device of claim 22, wherein the plurality of PDU layers comprise a base PDU layer and one or more additional PDU layers, and
wherein, to progressively encode the current frame, the one or more processors are individually or collectively operable to execute the code to cause the first device to:
encode the base PDU layer with a minimum level of quality; and
encode each of the one or more additional PDU layers with an increased level of quality relative to a previous PDU layer of the plurality of PDU layers.

24. The first device of claim 21, wherein the one or more processors are individually or collectively further operable to execute the code to cause the first device to:
receive, from the network entity, an indication of a quantity of PDU layers included in the progressively-encoded current frame after one or more PDU layers are truncated by the network entity.

25. The first device of claim 16, wherein the first QB curve is based at least in part on complexity information associated with the first frame.

26. The first device of claim 16, wherein the one or more processors are individually or collectively further operable to execute the code to cause the first device to:

receive, from an application, the first frame; and estimate, based at least in part on one or more QoE metrics corresponding to a plurality of encoding bitrates for encoding the first frame, the first QB curve.

27. The first device of claim 26, wherein the one or more QoE metrics comprise is a peak signal-to-noise ratio (PSNR), a structural similarity index (SSIM), a video multi-method assessment fusion (VMAF), or a mean opinion score (MOS).

28. The first device of claim 16, wherein the one or more processors are individually or collectively further operable to execute the code to cause the first device to:

estimate a QB curve for each frame of the set of frames, for each segment of the video stream, or based on a scene change in the video stream.

29. A method for wireless communications by a network entity, comprising:

receiving, from a first device, a first message comprising an indication of a first quality of experience (QoE)-bitrate (QB) curve associated with a first frame of a set of frames associated with a video stream;

transmitting, to the first device and based at least in part on the first QB curve, an operating point for encoding the first frame;

receiving, from the first device, a second message comprising a first packet data unit (PDU) set associated with the encoded first frame, wherein the encoded first frame is based at least in part on the operating point; and transmitting, to one or more user equipments (UEs), the first PDU set.

30. A method for wireless communications by a first device, comprising:

transmitting, to a network entity, a first message comprising an indication of a first quality of experience (QoE)-bitrate (QB) curve associated with a first frame of a set of frames associated with a video stream;

receiving, from the network entity and based at least in part on the first QB curve, an operating point for encoding the first frame;

encoding, based at least in part on the operating point, the first frame; and transmitting, to the network entity, a second message comprising a first packet data unit (PDU) set associated with the encoded first frame.

* * * * *